United States Patent
Yu

(10) Patent No.: US 11,611,905 B2
(45) Date of Patent: Mar. 21, 2023

(54) USER-PLANE APPARATUS FOR EDGE COMPUTING

(71) Applicant: Intel Corporation, Santa Clara, CA (US)

(72) Inventor: Yifan Yu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/650,728

(22) PCT Filed: Dec. 27, 2017

(86) PCT No.: PCT/CN2017/118818
§ 371 (c)(1),
(2) Date: Mar. 25, 2020

(87) PCT Pub. No.: WO2019/127068
PCT Pub. Date: Jul. 4, 2019

(65) Prior Publication Data
US 2020/0314694 A1    Oct. 1, 2020

(51) Int. Cl.
*H04L 12/713* (2013.01)
*H04L 12/741* (2013.01)
(Continued)

(52) U.S. Cl.
CPC .......... *H04W 28/10* (2013.01); *H04L 45/586* (2013.01); *H04L 45/74* (2013.01); *H04L 49/70* (2013.01); *H04L 69/22* (2013.01)

(58) Field of Classification Search
CPC ....... H04L 45/586; H04L 45/74; H04L 49/70; H04L 69/22; H04W 24/02; H04W 28/10
See application file for complete search history.

(56) References Cited

U.S. PATENT DOCUMENTS 8,565,076 B2 * 10/2013 Kowali ................. H04W 76/11
370/229
8,982,841 B2    3/2015 Srinivasan
(Continued)

FOREIGN PATENT DOCUMENTS

| CN | 1905732 A    | 1/2007 |
| CN | 103716881 A  | 4/2014 |
| WO | 2019127068 A1 | 7/2019 |

OTHER PUBLICATIONS

PCT International Search Report and Written Opinion dated Sep. 29, 2018 in PCT/CN2017/118818; 9 pages.

*Primary Examiner* — Alpus Hsu
(74) *Attorney, Agent, or Firm* — Compass IP Law PC

(57) ABSTRACT

There is disclosed in one example a radio access network (RAN) user plane processing entity (UPPE) for a mobile data network, including: a hardware platform; a virtual switch to operate on the hardware platform; a network interface to communicatively couple to a local server; and a software defined networking controller, including a radio access network (RAN) control plane (CP) sniffer, and configured to: receive a control plane traffic offloading rule via a northbound interface, the traffic offloading rule configured to offload a class of traffic to the local server; operate the RAN CP sniffer to build a user-plane flow control message according to the offloading rule; and send the flow control message to the virtual switch.

14 Claims, 12 Drawing Sheets

(51) Int. Cl.

*H04L 12/931* (2013.01)
*H04L 29/06* (2006.01)
*H04W 28/10* (2009.01)
*H04L 45/586* (2022.01)
*H04L 45/74* (2022.01)
*H04L 49/00* (2022.01)
*H04L 69/22* (2022.01)

(56) References Cited

U.S. PATENT DOCUMENTS

| | | | | |
|---|---|---|---|---|
| 9,167,501 B2* | 10/2015 | Kempf | | H04L 12/4633 |
| 9,614,757 B2* | 4/2017 | Roeland | | H04L 41/12 |
| 9,813,329 B2* | 11/2017 | Jayabalan | | H04L 45/28 |
| 9,998,967 B2* | 6/2018 | Perras | | H04W 36/12 |
| 10,084,728 B2* | 9/2018 | McCann | | H04W 40/20 |
| 10,178,023 B2* | 1/2019 | Hu | | H04L 45/38 |
| 10,219,175 B2* | 2/2019 | Costa-Requena | | H04L 41/12 |
| 10,601,734 B2* | 3/2020 | Heinonen | | H04L 12/4633 |
| 10,638,398 B2* | 4/2020 | Conole | | H04L 45/64 |
| 10,701,583 B2* | 6/2020 | Cheng | | H04W 28/0268 |
| 10,764,780 B2* | 9/2020 | Cheng | | H04W 28/0257 |
| 10,791,048 B2* | 9/2020 | McCann | | H04L 45/42 |
| 10,868,762 B2* | 12/2020 | Chung | | H04L 41/40 |
| 2012/0113937 A1* | 5/2012 | Aramoto | | H04W 8/18 |
| | | | | 370/329 |
| 2013/0322270 A1 | 12/2013 | Ko | | |
| 2014/0259012 A1* | 9/2014 | Nandlall | | G06F 9/45558 |
| | | | | 718/1 |
| 2015/0124622 A1* | 5/2015 | Kowali | | H04W 24/08 |
| | | | | 370/236 |
| 2015/0350912 A1* | 12/2015 | Head | | H04L 63/08 |
| | | | | 726/4 |
| 2016/0112269 A1* | 4/2016 | Singh | | H04L 41/0853 |
| | | | | 709/224 |
| 2016/0173535 A1* | 6/2016 | Barabash | | H04L 41/0893 |
| | | | | 726/1 |
| 2017/0055183 A1* | 2/2017 | Park | | H04L 61/5014 |
| 2017/0078927 A1* | 3/2017 | Hahn | | H04W 36/385 |
| 2017/0099658 A1* | 4/2017 | Shattil | | H04L 63/061 |
| 2017/0104609 A1* | 4/2017 | McNamee | | H04W 4/24 |
| 2017/0149670 A1* | 5/2017 | Backman | | H04L 45/38 |
| 2018/0219788 A1* | 8/2018 | Wackerly | | H04L 47/122 |
| 2018/0352038 A1* | 12/2018 | Sathyanarayana | | H04L 69/22 |
| 2019/0124577 A1* | 4/2019 | Li | | H04W 92/02 |
| 2019/0191471 A1* | 6/2019 | Yoshikawa | | H04W 76/12 |
| 2019/0313286 A1* | 10/2019 | Stümpert | | H04L 45/38 |
| 2020/0170056 A1* | 5/2020 | Allan | | H04W 36/08 |

* cited by examiner

USER-PLANE APPARATUS FOR EDGE COMPUTING

CROSS-REFERENCE TO RELATED APPLICATION

This application is a national stage application under 35 U.S.C. § 371 of PCT International Application Serial No. PCT/CN2017/118818, filed on Dec. 27, 2017 and entitled "USER-PLANE APPARATUS FOR EDGE COMPUTING," which is hereby incorporated by reference herein in its entirety.

FIELD OF THE SPECIFICATION

This disclosure relates in general to the field of network communications, and more particularly, though not exclusively, to a system and method for providing a user plane apparatus for edge computing.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
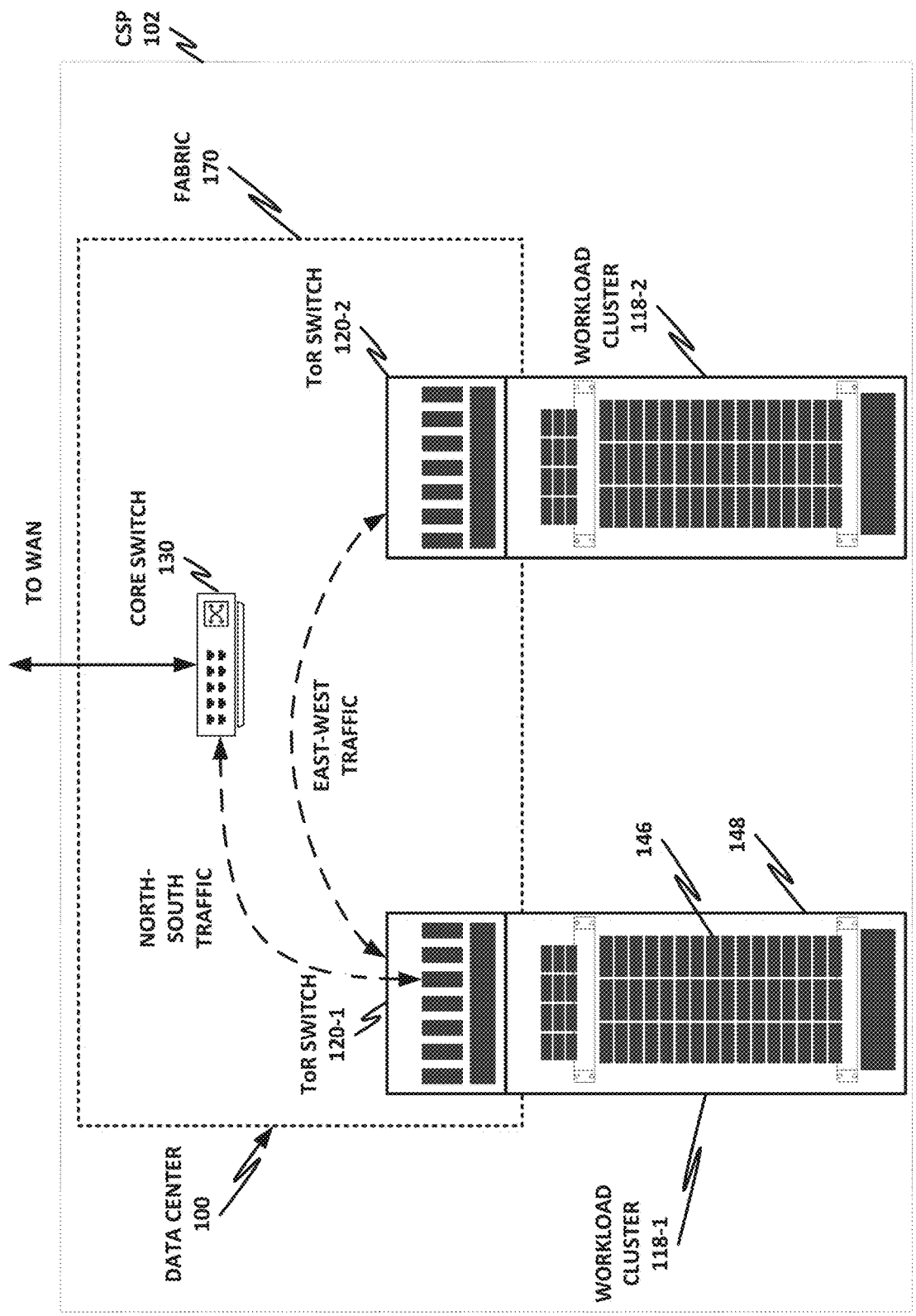
FIG. 1 is a block diagram of selected components of a data center, according to one or more examples of the present application.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

As both workload functions and network functions become increasingly virtualized in data centers and other data services, virtual switches (vSwitches) see an increasing share of traffic. A vSwitch is a virtualized (usually software-only) network switch that provides packet switching between virtual machines (VMs), such as VMs located on a single hardware platform. A vSwitch may include virtual ingress ports and virtual egress ports, as well as flow control rules similar or identical to those found on a hardware switch.

In some cases, a vSwitch may be tasked with determining whether a packet should be switched to the normal "inline" path, or should be "offloaded" to a diverted path. An example of this is multi-access edge computing (MEC) (also sometimes referred to as "mobile edge computing"). MEC is relatively recent feature of mobile networks, with some standardized behavior specified by the European Telecommunication Standards Institute (ETSI). In MEC, a workload function that is normally performed further downstream may be cloned and provided closer to the edge of the network (both logically in number of hops and physically in distance from the edge of the network) to reduce latency for certain classes of traffic.

MEC provides edge of the network application deployment for heterogeneous networks like Long Term Evolution (LTE), Wi-Fi, NarrowBand Internet of things (NB-IoT), and similar. It provides a platform to deploy 4G and $5^{th}$ Generation (5G) services with high bandwidth and low latency. By way of example, MEC may be embodied as a virtual machine or function listening on several interfaces and a global network node to service the delivery mechanism. MEC switching listens for messages and may be deployed as a standalone function, although MEC switching shares some similarities with traditional network switching.

Providing some additional intelligence in the vSwitch can add MEC switching functionality to the vSwitch to provide better performance and a smaller network footprint.

For example, in a 4G LTE or 5G wireless network, some classes of users may pay for high-speed data that can be used to consume bandwidth-intensive applications such as a video streaming service. Normally, the workload function of the video streaming service may be provided in a large data center inside or on the other side of the evolved packet core (EPC) network. Thus, when a user accesses the video streaming service, the user's packets are routed via the wireless tower to an eNodeB, from the eNodeB to the EPC, and from the EPC to a workload server in a data center.

Both the number of hops involved in this transaction and the physical distance traversed by the packets may introduce latency into the transaction. While the latency may be acceptable for ordinary use cases, some premium subscribers may be guaranteed higher bandwidth and/or lower-latency access to the video streaming service.

Thus, the workload function of the video streaming service may be cloned and provided as an edge service in a virtual machine much closer to the end user, such as in a blade server co-located with or near the eNodeB.

In an embodiment of MEC, an incoming packet may first hit the virtual local area network (vLAN), which inspects the packet and determines whether the packet belongs to a class of flows or packets that are to be offloaded for MEC processing. The flow rules that determine which packets are offloaded may be, for example, Open Flow rules (or stated differently, flow rules that conform to the Open Flow protocol and its associated standards).

If the packet is determined to be in a class of network traffic that is potentially subject to MEC (or other diversion) processing, the packet may be switched to an MEC platform services VM. The MEC platform services VM inspects the packet to determine whether the packet should be offloaded to a local MEC application, or should be sent via the normal inline path to a downstream workload service. As used throughout this specification, the term "offload" should be understood to include any special routing or switching of a packet to a destination other than one that would be reached via the normal flow of traffic. In particular, offloading may include switching a packet to a virtual network function (VNF), edge service, or workload server other than the normal path for its (for example) destination IP (Internet Protocol) address.

By way of example, a packet may have a destination address of 10.0.0.4, which is a virtual IP address (VIP) that ordinarily routes to a load balancer that load balances the traffic to a plurality of workload servers providing the network function in a data center. However, in the case of a offloading, a function such as an SDN controller may determine that the packet should be offloaded, such as to a local workload server providing the same function with a lower latency. Further as used throughout this specification, a packet is directed to an "inline" path if it is not offloaded. In other words, a packet with the destination IP address of 10.0.0.4 is switched to the downstream data center (core mobile network), where it hits the load balancer that services that virtual IP address, and is handled by a workload server in the ordinary workload server pool. Note that in many cases, the "inline" path may include some number of network functions in a "service chain" that a packet is to traverse before hitting its ultimately destination IP address. In the case where the service chain is part of the normal packet flow, passing the packet through the service chain before forwarding it to the final destination IP address is not considered "offloading" the packet for purposes of this specification and the appended claims.

In some embodiments, traffic offloading in a cellular network conforming to LTE or 5G specifications may be provided by MEC, based on a software defined networking (SDN) platform such as Open vSwitch (OVS).

Many LTE networks provide a northbound interface (NBI) configured to enable an external entity, such as a content provider, to configure OpenFlow rules, including rules for MEC offloading. For example, a content provider may provide OpenFlow rules to offload traffic to a local MEC server for certain premium subscribers. Some of these policies may be based on matching a field within the packet itself, while other policies may be based on matching a field not contained in the specific packet that may need to be diverted.

Some existing implementations of SDN such as Open vSwitch have shortcomings in this respect because they may process only the packet with the matching field inside the packet, such as the source or destination IP address. For example, ETSI specifies that the MEC platform should handle user plane traffic according to the access point name (APN) and bearer ID. But these fields are not available in a user plane packet processed in the switch and notified solely in the network signaling message. According to contemporary 3rd Generation Partnership Project (3GPP) and 5G network specifications, the gateway supporting the edge computing should conduct the traffic offloading based on the packet filters over the uplink that refers to the data flow from the radio access network (RAN) to the mobile core network. On the other hand, 3GPP specifies that the gateway should enable the packets from the local server to be forwarded to the RAN.

Thus, processing packets as specified by 3GPP and ETSI for MEC may involve relatively complicated steps such as general packet radio service (GPRS) tunneling protocol (GTP) encapsulation, decapsulation, and packet filtering.

An external entity may not have visibility into the packet-level data necessary to design OpenFlow rules as desired. For example, the external user may want to designate a specific bearer for offloading to a local MEC server. But lacking knowledge of the traffic at the packet level, the external entity may lack any straightforward method of designating traffic for offloading.

For example, within the EPC, each packet may be identified by a GTP-ID. While the external entity may know the APN it prefers for traffic offloading, individual packets may not include a direct identification of the APN in their headers. Thus, the external entity, which lacks visibility into the GTP-ID (or other identifying information, such as source or destination IP) of individual packets, may need to designate traffic for offloading according to APN. The individual packets are identified by a GTP-ID, but lack any direct indication of the APN. It is thus advantageous to provide a system and method that enables an external entity to craft OpenFlow rules according to factors, such as APN, visible to the external entity, and to provide a network entity that performs translation between the external user's high-level visibility (e.g., APN) and the individual packet's low-level attributes (e.g., GTP-ID or IP address).

To accommodate processing of user plane packets in an SDN-based network, embodiments of the present specification provide a RAN user plane (UP) processing entity (RAN UPPE) that extends the SDN approach in several respects, such as, by way of nonlimiting example:

The RAN UP processing entity may be introduced into the SDN controller so that a matching field not contained in the processed packet may be converted as the matching field inside the specific packet.

Matching fields are extended to enable packet filtering for the traffic offloading in MEC.

Additional actions may be introduced for the GTP user data tunneling (GTP-U) packet processing, including GTP-U encapsulation and decapsulation.

With these extensions, user plane traffic to or from the RAN can be tuned (for example, by an external entity) at the required granularity, such as at the packet level or bearer level by way of nonlimiting example. Advantageously, this method can be applied to upcoming generations of cellular networks such as 5G.

Embodiments of the present specification provide a RAN UPPE that interoperates with the SDN controller and OVS, such as within the serving gateway (SGW). The SDN switch may copy S1 signaling messages to a RAN control plane (CP) sniffer within the SDN controller. Using the RAN CP sniffer, the SDN controller can identify contents of the traffic flow in the RAN.

For example, the RAN CP sniffer may build a context for a specific UE from a control plane message. Control-plane level rules from the external entity may be received by the SDN controller. By referring to the context extracted by the RAN CP sniffer, the SDN controller is able to create a user-plane OpenFlow message matching the control-plane level rules. The SDN controller can then send the OpenFlow message to the OVS, which builds a traffic filtering rule based on the OpenFlow message. Packet fields used in the filtering rules may include, for example, GTP-ID, IP address, protocol ID, and port by way of nonlimiting example.

This enables external entities to designate traffic for offloading, such as by simply designating an APN of traffic to be offloaded. The SDN controller is able to translate the APN into OpenFlow rules that can be keyed to specific GTP-IDs or IP addresses. The SDN controller can then send appropriate OpenFlow messages to the OVS, which can setup OpenFlow rules that will handle traffic.

In embodiments of the specification, the RAN CP sniffer may also change the context of traffic flows to or from a base station. The SDN controller can use the context extracted by the RAN CP sniffer to build the appropriate OpenFlow messages, as described above.

When the switch receives an incoming packet, it applies the OpenFlow rules provided by the SDN controller to either offload the packet to the local MEC server, or to direct it to an inline path to the core mobile network.

The switch may be configured to properly identity packets for use with S1 signaling. These may be in some embodiments stream control transmission protocol (SCTP) packets. The S1 signaling is delivered as the SCTP segment in the RAN. The S1 signaling contains the information regarding the radio bearer (i.e. bearer ID) associated with the specific UE. This information may be used by the external application to set the traffic filtering rules in the gateway. For example, the external application may ask for the traffic offloading to the local server based on traffic flows with a specific bearer ID.

A system and method for providing a user plane apparatus for edge computing will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a data center 100 of a cloud service provider (CSP) 102, according to one or more examples of the present specification. Embodiments of data center 100 disclosed herein may be adapted or configured to interoperate with a user plane apparatus for edge computing according to the teachings of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 102 may provide, instead of or in addition to cloud services, high-performance computing (HPC) platforms or services. Indeed, while not expressly identical, HPC clusters ("supercomputers") may be structurally similar to cloud data centers, and unless and except where expressly specified, the teachings of this specification may be applied to either.

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a network interface card (NIC), a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 170. In other embodiments, the UPI (or other local coherent interconnect) may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies that may be found in the data center include, by way of nonlimiting example, Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in high-performance computing (HPC) applications, while Ethernet and FibreChannel are more popular in cloud data centers. But these examples are expressly nonlimiting, and as data centers evolve fabric technologies similarly evolve.

Note that while high-end fabrics such as OPA are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
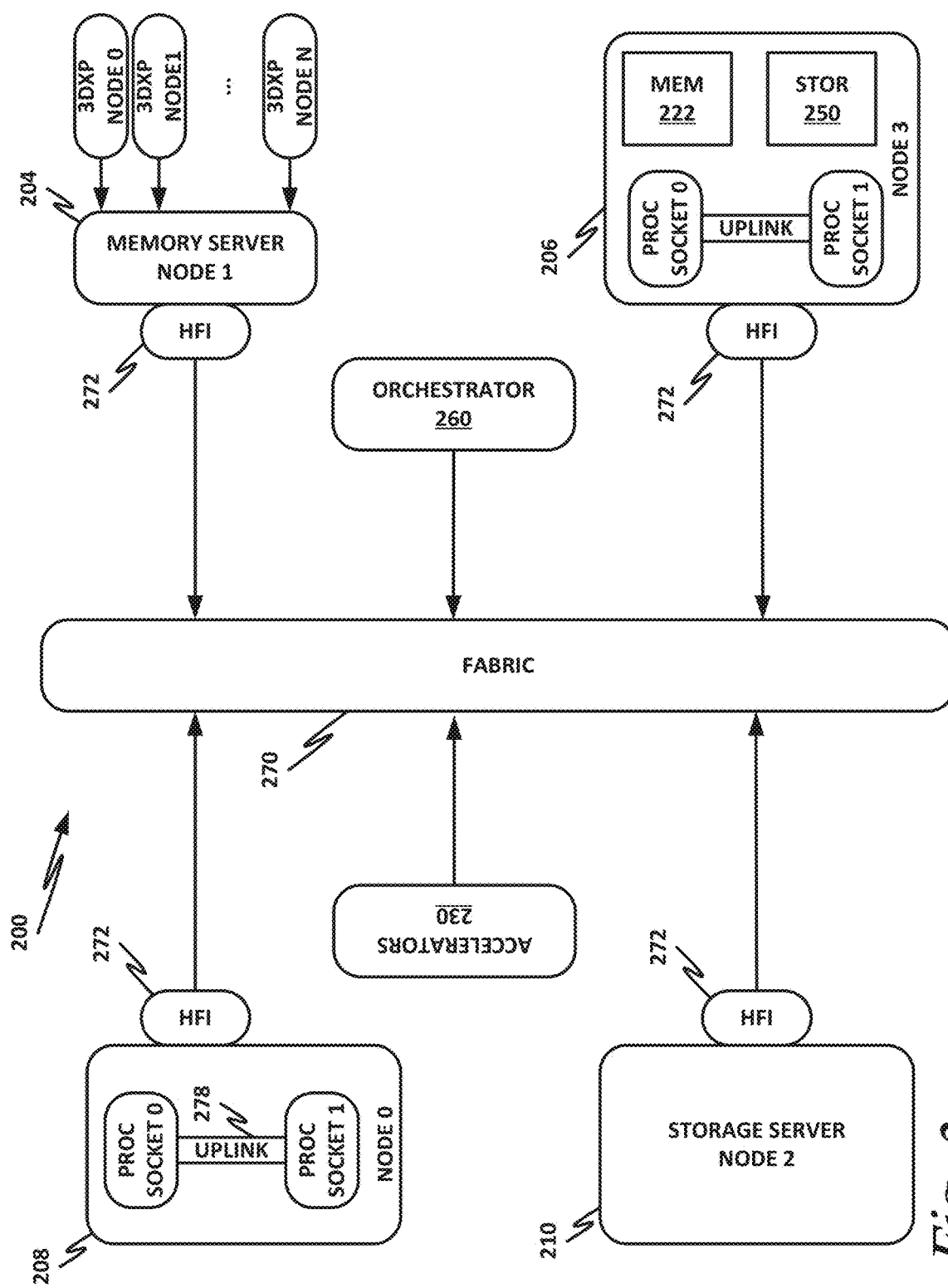
FIG. 2 is a block diagram of selected components of an end-user computing device, according to one or more examples of the present specification.

FIG. 2 is a block diagram of selected components of an end-user computing device 200, according to one or more examples of the present specification. Embodiments of computing device 200 disclosed herein may be adapted or configured to interoperate with a user plane apparatus for edge computing according to the teachings of the present specification. Computing device 200 may provide, as appropriate, cloud service, high-performance computing, telecommunication services, enterprise data center services, or any other compute services that benefit from a computing device 200.

In this example, a fabric 270 is provided to interconnect various aspects of computing device 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, computing device 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a vSwitch may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because computing device 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout computing device 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes a HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

Computing device 200 may also include accelerators 230. These may provide various accelerated functions, including hardware or coprocessor acceleration for functions such as packet processing, encryption, decryption, compression, decompression, network security, or other accelerated functions in the data center. In some examples, accelerators 230 may include deep learning accelerators that may be directly attached to one or more cores in nodes such as node 0 208 or node 3 206. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
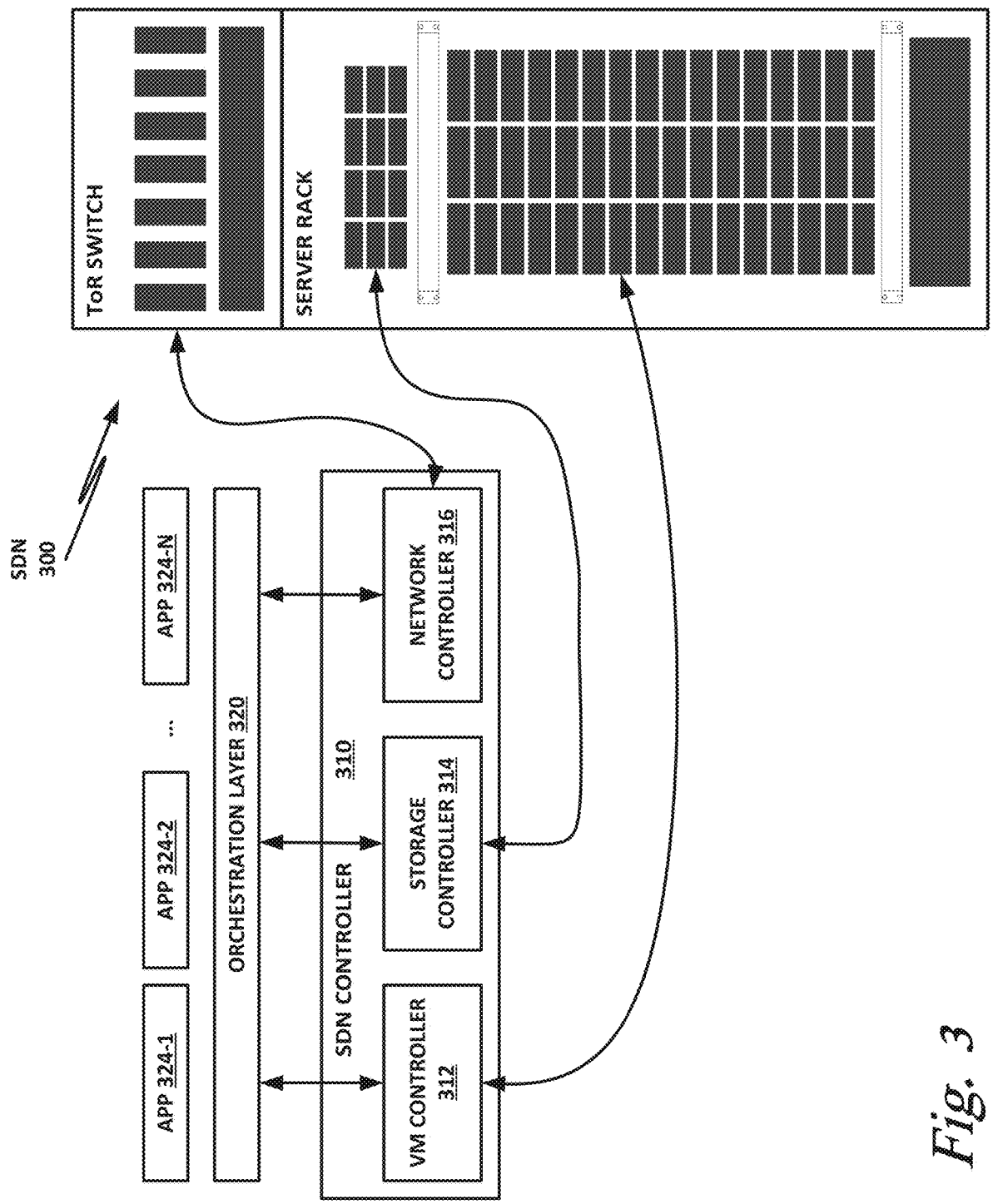
FIG. 3 is a block diagram of a software defined network, according to one or more examples of the present specification.

FIG. 3 is a block diagram of a software defined network (SDN) 300, according to one or more examples of the present specification. Embodiments of SDN 300 disclosed herein may be adapted or configured to interoperate with a user plane apparatus for edge computing according to the teachings of the present specification. In software defined networking, a single configuration utility (often a graphical interface or browser interface) may be used to manage network resources at a high level, with very little manual human intervention into the details of the network. SDN may provide a data plane that is separate from a control plane, to separate management functions from data functions. Another benefit of SDNs is that they may be based on open standards, thus providing portability between systems, and alleviating issues of vendor lock-in.

SDN 300 is controlled by an SDN controller 310, which may include, for example, a VM controller 312, a storage controller 314, and a network controller 316. Other SDN controller functions may also be provided in other embodiments, and not every embodiments is required to have the foregoing elements. SDN controller 310 provides an orchestration layer 320. The orchestration layer may employ an open orchestration protocol, such as the OpenStack cloud operating system.

Orchestration layer 320 may include various plugin components that can be used as interfaces to control data center resources. These plugins may interact with orchestration layer 320 via a set of standardized and open APIs, thus enabling different vendors to provide different plugins. In many cases, data center resources can all be managed via a single graphical interface provided by orchestration layer 320. For example, OpenStack currently provides a dashboard called "Horizon," which provides a monolithic interface that enables an administrator to fully configure and administer a data center.

In some embodiments, orchestration layer 320 provides a northbound API, on which may be instantiated various applications or functions, such as applications 324-1-324-N illustrated here. Each application 324 may be provided on a discrete virtual network device or container (referred to herein generically as "network devices"). Applications 324 may be configured to perform a variety of network functions, such as, by way of nonlimiting example, load-balancing, firewall, deep packet inspection (DPI), DNS, antivirus, or any other suitable network function. The particular arrangement of interconnections between network devices 330 and from network devices 330 to host devices 340 may be determined by the particular network configuration and needs. Thus, the specific configuration of FIG. 3 should be understood to be an illustrative example only.

Orchestration layer may provide communication protocols, including in some embodiments OpenFlow. OpenFlow centralizes networking intelligence into an SDN controller such as SDN controller 310. Using OpenFlow, switches and routers do not need to use prior data exchange protocols to learn about the network topology and other environmental factors. These topology data are replicated across all switches and routers in the network, and each one maintains forwarding tables. In contrast, an OpenFlow controller (which may be, for example, a function of network controller 316) provides centralized network management that maintains the network state in a central repository. Network controller 316 can then update forwarding tables as the network topology evolves or changes, generate a forwarding table for each switch or router, and push them out to network devices as necessary. This realizes separation of the control plane and the data plane. Individual network devices may implement the OpenFlow API by adding an OpenFlow shim layer that translates OpenFlow API function calls into native function calls for the switch or router.

Note that while this illustration shows a single SDN controller 310, in large data centers, an orchestration controller may control a number of distributed SDN controllers. In some embodiments, SDN controllers and orchestrators can communicate with one another to remain synchronization and state information via a sideband, such as a separate, lower-speed Ethernet connection.

Figure 4:
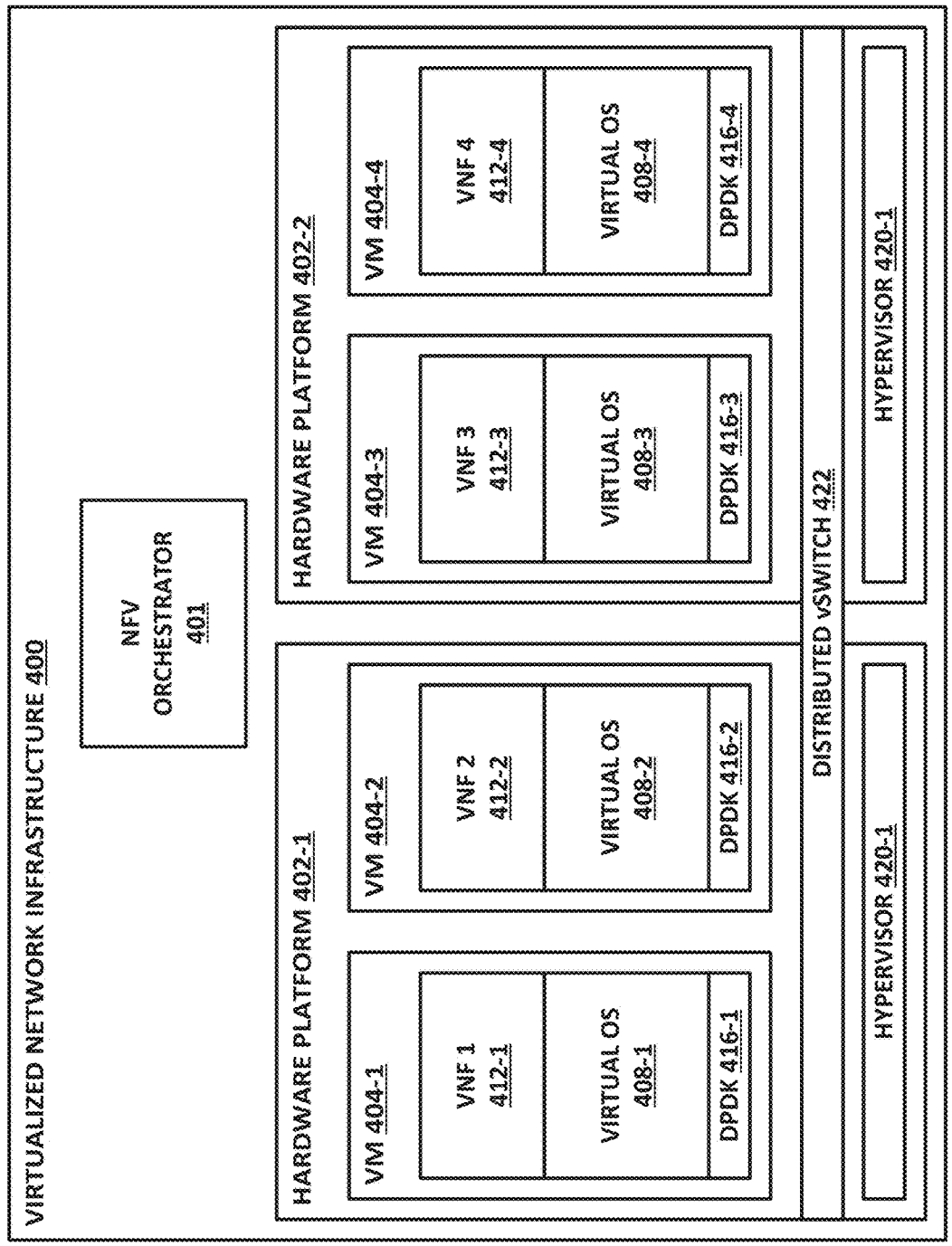
FIG. 4 is a block diagram illustrating a network function virtualization (NFV) architecture, according to one or more examples of the present specification.

FIG. 4 is a block diagram illustrating a network function virtualization (NFV) infrastructure 400 according to one or more examples of the present specification. Embodiments of NFV infrastructure 400 disclosed herein may be adapted or configured to interoperate with a user plane apparatus for edge computing according to the teachings of the present specification. NFV is an aspect of network virtualization that is generally considered distinct from, but that can still interoperate with SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications services. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

Like SDN, NFV is a subset of network virtualization. Thus, the network as illustrated in FIG. 4 may be defined instead of or in addition to the network of FIG. 3. In other words, certain portions of the network may rely on SDN, while other portions (or the same portions) may rely on NFV.

In the example of FIG. 4, an NFV orchestrator 401 manages a number of the VNFs 412 running on an NFVI 400. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 401 a valuable system resource. Note that NFV orchestrator 401 may provide a browser-based or graphical configuration interface, and in some embodiments may be integrated with SDN orchestration functions.

Note that NFV orchestrator 401 itself may be virtualized (rather than a special-purpose hardware appliance). NFV orchestrator 401 may be integrated within an existing SDN system, wherein an operations support system (OSS) manages the SDN. This may interact with cloud resource management systems (e.g., OpenStack) to provide NFV orchestration. An NFVI 400 may include the hardware, software, and other infrastructure to enable VNFs to run. This may include a hardware platform 402 on which one or more VMs 404 may run. For example, hardware platform 402-1 in this example runs VMs 404-1 and 404-2. Hardware platform 402-2 runs VMs 404-3 and 404-4. Each hardware platform may include a hypervisor 420, virtual machine manager (VMM), or similar function, which may include and run on a native (bare metal) operating system, which may be minimal so as to consume very few resources.

Hardware platforms 402 may be or comprise a rack or several racks of blade or slot servers (including, e.g., processors, memory, and storage), one or more data centers, other hardware resources distributed across one or more geographic locations, hardware switches, or network interfaces. An NFVI 400 may also include the software architecture that enables hypervisors to run and be managed by NFV orchestrator 401.

Running on NFVI 400 are a number of VMs 404, each of which in this example is a VNF providing a virtual service appliance. Each VM 404 in this example includes an instance of the Data Plane Development Kit (DVDK), a virtual operating system 408, and an application providing the VNF 412.

Virtualized network functions could include, as nonlimiting and illustrative examples, firewalls, intrusion detection systems, load balancers, routers, session border controllers, deep packet inspection (DPI) services, network address translation (NAT) modules, or call security association.

The illustration of FIG. 4 shows that a number of VNFs 404 have been provisioned and exist within NFVI 400. This figure does not necessarily illustrate any relationship between the VNFs and the larger network, or the packet flows that NFVI 400 may employ.

The illustrated DPDK instances 416 provide a set of highly-optimized libraries for communicating across a vSwitch 422. Like VMs 404, vSwitch 422 is provisioned and allocated by a hypervisor 420. The hypervisor uses a network interface to connect the hardware platform to the data center fabric (e.g., an HFI). This HFI may be shared by all VMs 404 running on a hardware platform 402. Thus, a vSwitch may be allocated to switch traffic between VMs 404. The vSwitch may be a pure software vSwitch (e.g., a shared memory vSwitch), which may be optimized so that data are not moved between memory locations, but rather, the data may stay in one place, and pointers may be passed between VMs 404 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 422 is illustrated, wherein vSwitch 422 is shared between two or more physical hardware platforms 402.

Figure 5:
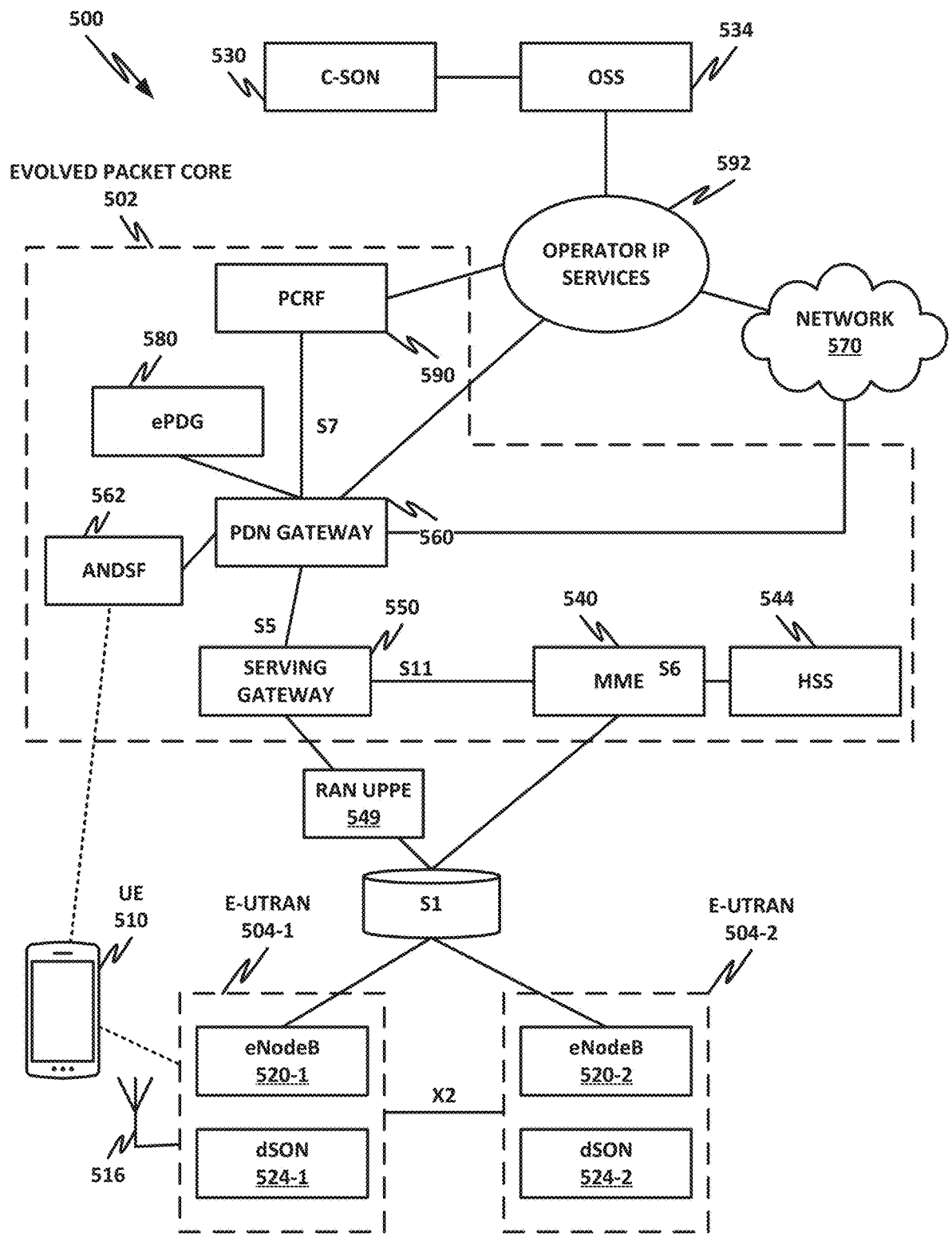
FIG. 5 is a block diagram of a mobile network, according to one or more examples of the present specification.

FIG. 5 is a block diagram of a mobile network 500 according to one or more examples of the present specification. Embodiments of mobile network 500 disclosed herein may be adapted or configured to interoperate with a user plane apparatus for edge computing according to the teachings of the present specification. In this specific example, a 4th Generation long-term evolution (4G LTE, or simply LTE) network is disclosed by way of non-limiting example. In certain embodiments, LTE is used primarily for data transfer, so that mobile network 500 may also provide, in addition to the elements shown here, structure for handling voice communication, which may communicatively couple to a public-switched telephone network (PSTN). In some cases, voice over LTE (VoLTE) may also be provided. It should also be noted that LTE is disclosed only as one possible embodiment of the teachings of this Specification, and that the teachings may be relevant to other telecommunication structures now in existence or later developed, and the scope of this Specification is intended to encompass such structures where applicable.

In this example, mobile network 500 includes user equipment (UE) 510 communicatively coupled, for example via a wireless antenna 516, to an evolved UMTS radio access network (E-UTRAN) 504. UE 510 may initiate a data transaction or session with E-UTRAN 504-1, referred to herein as a "data call." E-UTRAN 504 communicatively couples to an evolved packet core (EPC) 502, for example via wired connections. E-UTRAN 504 may include, by way of non-limiting example, an evolved NodeB (eNB) 520, which acts as a wireless base station, and a distributed self-organizing network (dSON) controller 524.

In various embodiments, these functions may be provided by dedicated servers or appliances. In other embodiments, select functions may be provided in virtual environments, such as a rack-mounted server providing various functions in a hypervisor. In a general sense, the various UE-class devices, server-class devices, network functions, may be generally classified as "computing devices." As used throughout this Specification, a computing device includes any electrical or electronic device based on the Von Neumann architecture, including a processor with a control unit and logic unit, and a memory. In that context, it should be understood that the Von Neumann architecture may be provided either as a physical device, or as a virtual machine or hypervisor running at one or more layers of abstraction from the physical hardware.

In this example, two E-UTRANS 504-1 and 504-2 are disclosed to illustrate the mobile nature of the network. UE 510 may move, for example, as a user carrying UE 510 moves. As UE 510 moves farther away from E-UTRAN 504-1, its signal to E-UTRAN 504 will attenuate. If UE 510 simultaneously moves closer to E-UTRAN 504-2, its signal with E-UTRAN 504-2 will become stronger. When UE 510 has moved such that it gets a stronger signal to E-UTRAN 504-2 than to E-UTRAN 504-1, E-UTRAN 504-1 may hand off the data call to E-UTRAN 504-2, so that E-UTRAN 504-2 seamlessly continues handling the data call.

Handoff may be handled over the X2 interface. In this example, two classes of signals are passed within mobile network 500: voice, data, and call signals (referred to herein as the "user plane" signals) and control signals (referred to herein as the "control plane" signals). X2 provides both a control plane interface and a user plane interface, and in an embodiment is a wired connection between the two E-UTRANs 504. The protocol structure of the S1 control plane is based on stream control transmission protocol/internet protocol (SCTP/IP). The user plane provides a protocol structure based on GPRS tunneling protocol/user datagram protocol/IP (GTP/UDP5/IP). On the user plane, a transport bearer may be identified by an IP address and one or more GTP tunneling endpoint IDs (TEID). X2 operates as a meshed interface, meaning that a plurality of eNBs 520 may all be linked together. Properly configured, X2 helps to minimize packet loss as UE 510 hands off from one E-UTRAN 504 to another. Specifically, when the data call is handed off, unsent or unacknowledged packets stored in the old eNB 520's queues can be forwarded or tunneled to the new eNB 520 via the X2 interface.

E-UTRANs 504 communicatively couple to an EPC 502 via an S1 interface. As with the X2 interface, S1 provides both a control plane and a user plane, configured similarly to the respective X2 control plane and user plane. In an embodiment, the S1 application protocol (S1-AP) is mapped directly on top of SCTP.

In this example, EPC 502 includes a serving gateway (SGW) 550, a mobility management entity (MME) 540, a home subscriber server (HSS) 544, a packet data network (PDN) gateway 560, an evolved packet data gateway (ePDG) 580, and policy and charging rules function (PCRF) 590. EPC 502 for its part may communicatively couple, via appropriate interfaces, to a public network such as internet 570, or to operator IP services 592.

Figure 9:
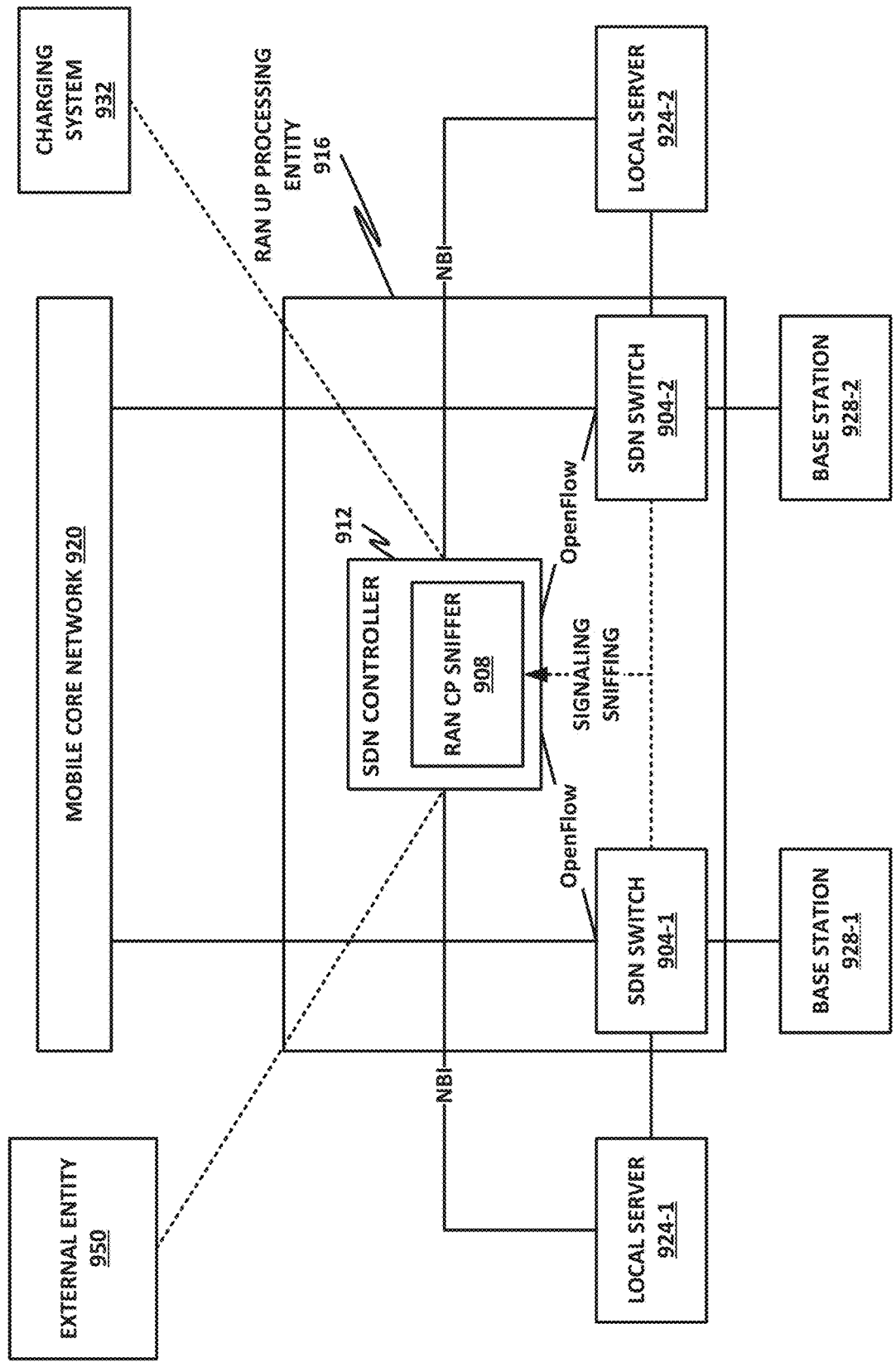
FIG. 9 illustrates various extensions that may be provided to a software defined networking (SDN) controller, according to one or more examples of the present specification.

Embodiments may also include a RAN user plane processing entity (RAN EPPE) 549, which in one embodiment is disposed between eNodeBs 520 and SGW 550 on the S1 interface. Further details concerning an embodiment of a RAN UPPE are illustrated in FIG. 9 below.

When UE 510 is performing data operations, such as web applications, web surfing, e-mail, or other network operations, UE 520 connects to Internet 570 via mobile network 500. In one example scenario, user plane signals originate from UE 510 and are passed to E-UTRAN 504. Within E-UTRANs 504, user plane signals are first received by eNB 520 (or other similar base station), which interfaces with EPC 502 to handle the data call.

As a wireless local area network (WLAN) access point (WAP), eNB 520 supports Layer 1 and Layer 2 of the E-UTRAN orthogonal frequency division multiplexing (OFDM) physical interface. Advantageously, eNBs 520 may directly connect to a network router, thus simplifying network architecture. Further, eNB 520 may support certain legacy features related to physical layer procedures for transmitting and receiving, including modulation and demodulation, and channel encoding and decoding. Additionally, eNB 520 may also provide radio resource control and radio mobility management for processing handovers.

EPC 502 provides several functional blocks to provide various support functions. These are described herein by way of non-limiting example only.

MME 540 provides control functions to EPC 502. MME 540 provides idle mode UE paging and tagging procedures, including retransmissions. MME 540 also provides bearer activation and deactivation support, and may choose an appropriate SGW 550 for UE 510 when UE 510 initially attaches to EPC 502 via E-UTRAN 504. After attachment, MME 540 authenticates UE 510 via HSS 544.

Non Access Stratum (NAS) signaling terminates at MME 540, and MME 540 is also responsible for generating and allocating a temporary identity for UE 510. MME 540 then verifies the authorization of UE 510 to resources on the service provider's public land mobile network (PLMN), and enforces roaming restrictions on UE 510. MME 540 is also a terminal endpoint for ciphering/integrity protection for NAS signaling, and handles security key management. MME 540 also supports lawful signal interception. MME 540 also provides control plane functions for mobility between LTE and 2G/3G networks with the S3 interface terminating at MME 540 from, for example, a 3G serving GPRS support node (SGSN). Finally, MME 540 terminates the S6a interface of HSS 544 for roaming UEs.

HSS 544 is, in an embodiment, a database server to provide home location register (HLR) and authentication center (AuC) services. The functions of the HSS include call and session establishment support, user authentication, and access authorization, by way of non-limiting example.

In an embodiment, HLR stores and updates a user subscription information database. This may include the following, by way of nonlimiting example:
 a. User identification and addressing, including the International Mobile Subscriber Identity (IMSI), Mobile Subscriber ISDN Number (MSISDN), and/or mobile telephone number.
 b. User profile information, including subscriptions and quality of service (QoS) data.

AuC generates security data from user identity keys, and provides the data to at least the HLR, and as necessary, to other functional blocks.

SGW 550 forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN Gateway 550). When UE 510 is idle, SGW 550 terminates the downlink data path and triggers paging when downlink data arrives for UE 510. SGW 550 may also store UE contexts including parameters of the IP bearer service and network internal routing information. It also performs replication of the user traffic in case of lawful interception.

PDN Gateway 560 provides connectivity from UE 510 to external packet data networks (PDNs) and provides both an entry point and exit point for UE traffic. UE 510 may simultaneously connect to more than one PDN Gateway 550, and thus may access multiple PDNs. In an example, PDN Gateway 550 provides policy enforcement, packet filtering on a per-user basis, charging support, lawful interception, and packet screening, by way of nonlimiting example.

Access Network Discovery and Selection Function (ANDSF) 562 helps UE 510 discover non-3GPP access networks, such as Wi-Fi or WIMAX, that can be used in addition to the LTE network for data communication. ANDSF 560 may provide UE 510 with rules policing the connection to such networks. ANDSF 560 may provide the following to UE, by way of non-limiting example:
 a. Inter-system mobility policy (ISMP)—network selections rules for when UE 510 has no more than one active access network connection (e.g., either LTE or Wi-Fi).
 b. Inter-system routing policy (ISRP)—network selection rules for when UE 510 has potentially more than one active access network connection (e.g., both LTE and Wi-Fi). In this case, UE 510 may employ IP flow mobility, multiple-access PDN connectivity (MAPCON), or non-seamless Wi-Fi offload according to policy and user preferences.
 c. Discovery information—a list of networks that may be available in the vicinity of UE 510, and information to help UE 510 connect to these networks.

ANDSF 562 may communicate with the UE 510 over the S14 reference point, which in some embodiments is specific to ANDSF.

PCRF 590 provides, in an embodiment, both policy decision functions (PDF) and charging rules functions (CRF).

PDF makes policy decisions. Specifically, when an IP multimedia subsystem (IMS) is set up, session initiation protocol (SIP) data include media requirements, which the terminal and proxy call session control function (P-CSCF) may exchange between themselves. During the session establishment process, the PDF may also receive those requirements from the P-CSCF and make decisions based on network operator rules. These may include, by way of non-limiting example:
 a. Allowing or rejecting a media request.
 b. Using new or existing PDP context for an incoming media request.
 c. Checking allocation of resources against authorized resource usage.

The CRF provides operator-defined charging rules applicable to each service data flow. The CRF selects the relevant charging rules based on information provided by the P-CSCF, such as Application Identifier, Type of Stream (audio, video, etc.), or Application Data Rate, by way of nonlimiting example.

Data transmission is secured by ePDG 580 with a UE 510 connected to EPC 502 over an untrusted, non-3GPP access. For this purpose, the ePDG acts as a termination node of IPsec tunnels established with UE 510.

Network 570 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Network 570 may also include one or more servers, firewalls, routers, switches, security appliances, antivirus servers, or other useful network devices. In this illustration, network 570 is shown as a single network for simplicity, but in some embodiments, network 570 may include a large number of networks, such as one or more enterprise intranets connected to the Internet.

Operator IP services 592 include services provided by an operator of EPC 502. Operator IP services 592 may include, or may communicatively couple to an operations support system (OSS) 532. OSS 532 provides hardware and software for monitoring, controlling, analyzing, and managing EPC 502.

Advantageously, LTE provides for self-organizing networks (SONs) (also sometimes called a self-optimizing network, which is used interchangeably). SON provides automation methods to facilitate planning, configuring, managing, optimizing, and healing a network such as EPC 502 and E-UTRAN 504.

SON may be provided in different flavors, including for example centralized SON (C-SON) 530, distributed SON (dSON) 524, and in some cases hybrid SON (hSON).

C-SON 530 provides centralized higher-level network control, with increased coordination between nodes for functions such as load balancing across a wide geographic area. In contrast, dSON 524 provides a distributed, peer-to-peer control function, in which each E-UTRAN network wirelessly receives reported parameters from other E-UTRANs, and makes autonomous decisions based on those reports. hSON (not shown in this illustration) provides a hybrid solution in which some functions are centralized and others are distributed.

Advantageously, SON provides useful functions such as:
a. Self-Configuration. In a self-configuration network, new base stations are automatically configured and integrated into the network, and new features on a base station are also seamlessly integrated. When a new base station is introduced into the network and powered on, it is immediately recognized and registered by the network. The neighboring base stations then automatically adjust to provide the required coverage and capacity, as well as to avoid the interference.
b. Self-Optimization. Base station such as eNBs 520 may provide configuration parameters intended to control and/or optimize their behavior. Based on observations of both eNB 520 itself, and measurements at UE 510 or elsewhere, a SON may automatically reconfigure these parameters to enhance network efficiency. In another embodiment, SON provides automatic neighbor relations (ANR), and optimizes random access parameters or mobility robustness. In yet another embodiment, SON switches off some number of base stations at night to conserve power. These base stations may be selected to ensure that full coverage is still provided in a coverage area. Neighboring base station may reconfigure appropriate parameters to ensure full coverage and adjust to the changed network topology. If a sudden spike in demand occurs, one or more sleeping base stations may wake up almost instantaneously. This may realize significant power savings without sacrificing network
c. Self-Healing. If a network node (such as an eNB 520) goes down, self-healing helps to mitigate the effect of the failure on the overall network. For example a SON may adjust parameters and algorithms in adjacent eNBs 520 so that they can continue to provide service to the failed eNB 520. This is in contrast to legacy networks, where substantial time and resources may need to be committed to repairs when a base station fails. With self-healing networks, the network may automatically and nearly-instantaneously self-adjust with little or no service interruption.

Figure 6:
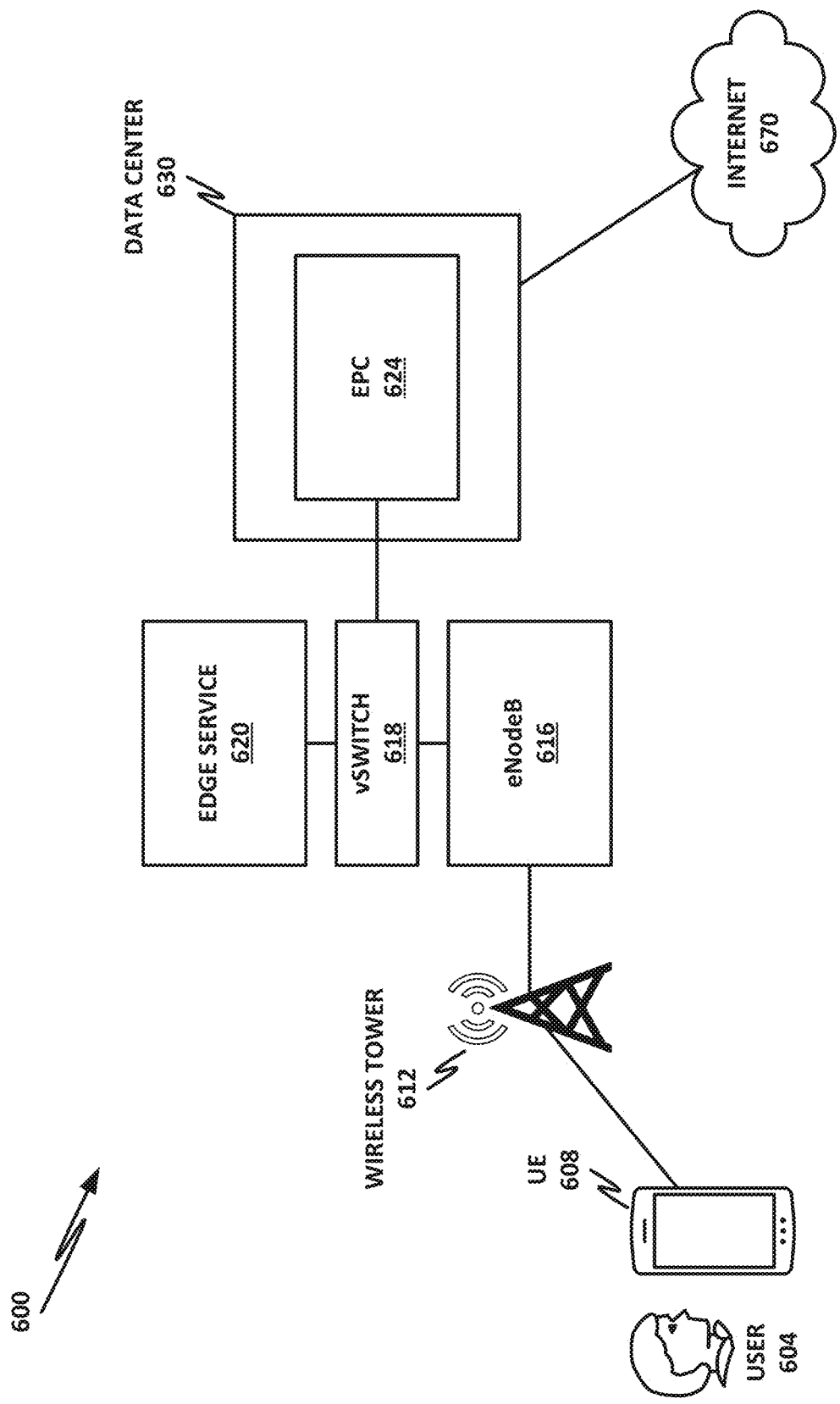
FIG. 6 is a block diagram of a wireless network, according to one or more examples of the present specification.

FIG. 6 is a block diagram of a wireless network 600 according, to one or more examples of the present specification. Embodiments of wireless network 600 disclosed herein may be adapted or configured to interoperate with a user plane apparatus for edge computing according to the teachings of the present specification.

In the example of FIG. 6, a user 604 operating user equipment 608 communicates with wireless network 600. Specifically, user equipment 608 may be equipped with a wireless transceiver that can communicate with a wireless tower 612. Wireless tower 612 is then communicatively coupled to a base station, such as an eNodeB 616.

In the present embodiment, eNodeB 616 is an example of a base station used in a 4G LTE network. In other examples, other base stations may be used, such as a 3G NodeB, or a 5G or later base station. A vSwitch 618 services eNodeB 616, and may be configured to switch packets to an evolved packet core (EPC) 624. EPC 624 may be located in a data center 630, and may couple wireless network 600 to the Internet 670, or to any other network.

In this example, eNodeB 616 also includes an edge service 620. Edge service 620 provides a service or workload function that may be located at or near eNodeB 616, and which may provide a high bandwidth and/or low latency connection to user 604. For example, user 604 may be a premium subscriber to services of wireless network 600, and may be contractually provided with higher throughput. Edge service 620 could be by way of illustration a streaming video service, in which case it is advantageous to locate edge service 620 physically closer to eNodeB 616 (i.e., in terms of physical distance), and logically closer to eNodeB 616 (i.e., in terms of number of hops from eNodeB 616).

However, it should be noted that not all traffic provided by edge service 620 should be routed to edge service 620. For example, other nonpremium subscribers may be accessing wireless network 600, in which case their traffic may be routed to EPC 624, or out to Internet 670. Thus, when vSwitch 618 receives an incoming packet, the packet may take one of two paths. The packet may be directed to EPC 624 via an "inline" path, or may be "diverted" to edge service 620. The determination of whether to direct the incoming packet inline to EPC 624 or to divert the packet to edge service 600 may depend on a number of factors, including properties of the packet itself, such as subscriber information, or other information such as the loading on various network elements.

Figure 7:
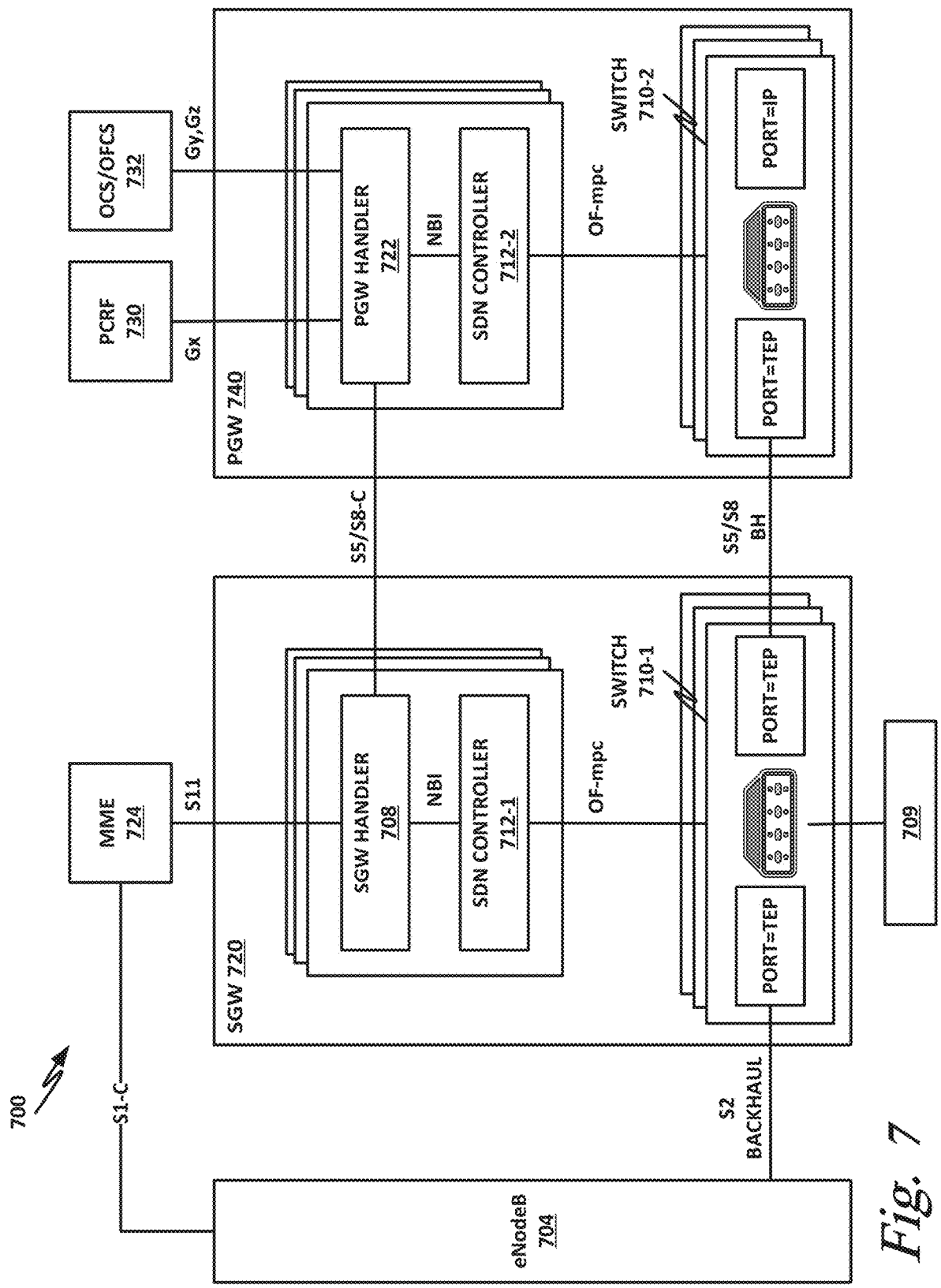
FIG. 7 is a block diagram of a mobile data network, according to one or more examples of the present specification.

FIG. 7 is a block diagram of a mobile data network 700, according to one or more examples of the present specification. Mobile data network 700 of FIG. 7 may be provided in some examples with the ability to perform traffic offloading such as for MEC.

Current ETSI practice assumes that the MEC platform supports flexible offloading policies. In some existing 3GPP approaches, such as local IP access/selected IP traffic offload (LIPA/SIPTO), the network may rely solely on the local gateway (LGW) to conduct the offloading based on packet data network (PDN) connectivity identified with the APN. The more sophisticated control on the user plane such as quality of service (QoS) provisioning may be unable to support this offloading because of the rigid PDN connectivity management conducted in the existing 3GPP network infrastructure.

An SDN-based solution as illustrated in FIG. 7 provides flexibility in user plane processing of the mobile network. For example, currently the Wireless and Mobile Working Group of the Open Networking Foundation (ONF) provides for a centralized evolved packet core (EPC) platform built with an SDN-based serving gateway (SGW) 720 and packet data network gateway (PGW) 740, as illustrated in FIG. 7. In network 700, SGW 720 is communicatively coupled to eNodeB 704 via mobility management entity (MME) 724, via the 511 and S1-C interfaces. SGW 720 also includes an S2 backhaul interface to eNodeB 704. SGW 720 may include one or more SGW handler instances 708, which interface with an SDN controller 712-1. SDN controller 712-1 provides connectivity to a switch 710-1, which may be, for example, an Open vSwitch. Switch 710 may switch traffic according to a tunneling endpoint (TEP) and may switch traffic to PGW 740. PGW 740 includes one or more instances of a PGW handler 722, also provided with an SDN controller 712-2 and a switch 710-2, which again may be an Open vSwitch. Switch 710-2 receives traffic according to a tunneling endpoint, and switches traffic out according, for example, to an IP address. Note that PGW handler 722 communicatively couples to SGW handler 708 via the S5 and S8-C interfaces, while switch 710-2 includes S5 and S8 backhaul interfaces. As illustrated in FIG. 5, PGW 740 may also communicatively couple to policy and charging rules function (PCRF) 730 and online charging system offline charging system (OCS/OFCS) 732.

In the LIPA/SIPTO approach of 3GPP, a terminal may be connected via a small base station to access IP-capable entities in the same residential or enterprise IP network without the user plane traversing the mobile operator's network. This may be achieved with the LIPA/SIPTO PDN connection established by the terminal request based on the APN. The terminal and the base station may be updated to support the signaling for the LIPA/SIPTO connection establishment.

In an embodiment, when encapsulated traffic arrives on switch 710-1 via S1 backhaul, switch 710-1 consults its OpenFlow rules, which indicate that the traffic is to be send to SGW handler 708, which includes an SDN controller 712-1. SGW handler 708 may then direct the traffic to PGW 740 via the S5 or S8 interface.

However, in embodiments that support MEC, a local server 709 may be provided, and may be configured to provide MEC services. Thus, switch 710-1 may need to have logic for determining that the traffic belongs to a class of traffic for offloading to local server 709. However, some existing embodiments of an SGW 720 support traffic offloading based only on fields contained in the packet header itself, such as source IP or destination IP. They may lack support for offloading traffic based on user plane data, such as access point name (APN) or bearer ID, which are not available in encapsulated user plane packets. Thus, embodiments of the present specification introduce a RAN UPPE, as illustrated in more detail in FIG. 9, which is capable of converting a matching field not contained in the processed packet into a matching field inside the processed packet.

Network edge virtualization software development kit (NEV-SDK, for example, as provided by Intel® Corporation) in some embodiments enables user plane traffic processing at the network edge in which the MEC application is supported. But some embodiments of NEV-SDK may not be configured to support online configuration for traffic offloading. When a new server is deployed in the local network, the gateway with the NEV-SDK may need to be rebooted for the new offloading configuration to take effect. This causes network interruption during operation. This is illustrated in FIG. 8, below.

Figure 8:
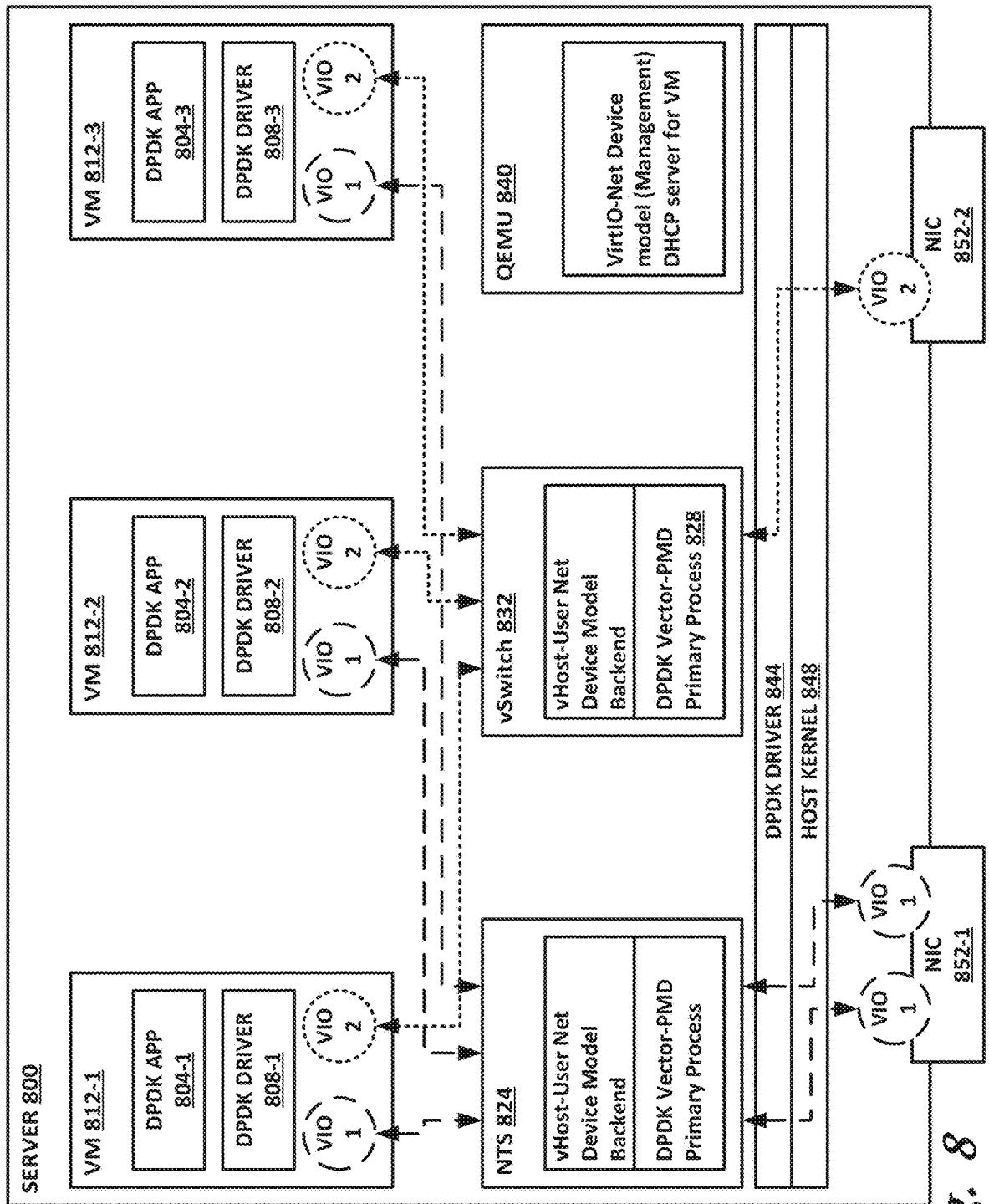
FIG. 8 is a block diagram illustrating a server with multi-access edge computing (MEC) capabilities, according to one or more examples of the present specification.

FIG. 8 illustrates a server 800 with MEC capabilities, according to one or more examples of the present specification. Server 800 includes a plurality of virtual machines (VMs), namely VM 812-1, VM 812-2, and VM 812-3. Each VM 812 is provided with a respective data plane development kit (DPDK) application 804, namely DPDK application 804-1, DPDK application 804-2, and DPDK application 804-3. VMs 812 also respectively include DPDK driver 808-1, DPDK driver 808-2, and DPDK driver 808-3.

Server 800 also includes quick emulator (QEMU) 840, which may provide paravirtualized input/output network (virtio-net) device model management, and a dynamic host configuration protocol (DHCP) server for virtual machines 812. Furthermore, server 800 includes virtual switch (vSwitch) 832 and network traffic service (NTS) 824. Each VM 812-1 includes virtual input/output (virtio) rings that connect to one of NTS 824 or vSwitch 832. For example, virtio ring 1 connects to NTS 824, while virtio ring 2 connects to vSwitch 832. In this illustration, the connections for the two different virtio rings are shown with different line styles to illustrate the connections.

NTS 824 provides a virtual host (vhost) user net, device model, and backend. It also provides a DPDK vector poll mode driver (PMD) and primary process. vSwitch 832 provides a vhost user net, device model, and backend, and also provides DPDK vector PMD and a primary process.

The difference between NTS 824 and vSwitch 832 is that NTS 824 provides eNodeB and EPC traffic switching, while vSwitch 832 provides inter-VM and Internet traffic switching. Thus, traffic that traverses NTS 824 may be assigned to one of two virtio 1 rings of network interface card (NIC) 852-1. One of these virtio rings may provide eNodeB traffic, while the other may provide EPC traffic.

On the other hand, vSwitch 832 connects to virtio ring 2 of NIC 852-2. NIC 852-2 provides Internet traffic to and from server 800. Note that NICs 852-1 and 852-2 may be very high speed NICs, such as 10 Gb NICs or better.

Embodiments of NTS 824 may include novel OpenFlow rules that are configured to provide encapsulation and decapsulation.

FIG. 9 illustrates various extensions that may be provided to an SDN controller to extend the existing SDN approach such as Open vSwitch, according to one or more examples of the present specification.

In this embodiment, a RAN user plane (UP) processing entity 916 is provided. As discussed above, an external entity 950 may be granted the ability to designate certain traffic for MEC processing on local servers 924, rather than being processed via the inline path on mobile core network 920. For example, a content provider may be able to specify offloading for premium subscribers. However, external entity 950 may lack packet-level visibility into user plane packets. Rather, external entity 950 may be able to specify offloading according to bearer ID or APN. In operation, these may need to be translated into a GPT-ID or IP address.

RAN UP processing entity 916 provides a distributed gateway for edge computing. Embodiments of RAN UP processing entity 916 include an SDN controller 912, which includes a RAN control plane (CP) sniffer 908. RAN user plane processing entity 916 in one embodiment resides over the UP/CP interface between the RAN and the mobile core network (for example, S1 in LTE, as illustrated in FIG. 5). RAN UP processing entity 916 includes one or more SDN switches 904, such as SDN switch 904-1 and SDN switch 904-2. Furthermore, RAN UP processing entity 916 may communicatively couple to one or more base stations, such as base station 928-1 and base station 928-2, which may be for example eNodeB, and which may enable RAN UP processing entity 916 to communicatively couple to the user equipment operated by a user of the mobile network.

RAN CP sniffer 908 may act as a built-in plugin in SDN controller 912. It may be used to sniff the RAN signaling messages exchanged between the RAN and the mobile core network 920. This enables SDN controller to convert a bearer-level offloading policy (e.g., a bearer ID or APN) into an OpenFlow message that SDN switches 904 can use to build appropriate packet-level (user plane) OpenFlow rules. The northbound interface (NBI) is provided by the SDN controller to allow the mobile core network 920 or the local server to set the offloading policy. The NBI may also connect charging system 932 to report counting of the volume of the traffic offloaded to local servers 924-1 or 924-2.

For example, RAN CP sniffer 908 may build a context for a specific UE from a control plane message. Control-plane level rules from the external entity may be received by SDN controller 912. By referring to the context extracted by RAN CP sniffer 908, SDN controller 912 is able to create a user-plane OpenFlow message matching the control-plane level rules. SDN controller 912 can then send the OpenFlow message to an SDN switch 904 (e.g., an open vSwitch (OVS)), which builds a traffic filtering rule based on the OpenFlow message. Packet fields used in the filtering rules may include, for example, GTP-ID, IP address, protocol ID, and port by way of nonlimiting example.

The SDN switch 904 may be configured to properly identity packets for use with S1 signaling. These may be in some embodiments stream control transmission protocol (SCTP) packets. The S1 signaling is delivered as the SCTP segment in the RAN. The S1 signaling contains the information regarding the radio bearer (i.e. bearer ID) associated with the specific UE. This information may be used by the external application to set the traffic filtering rules in the gateway. For example, the external application may ask for the traffic offloading to the local server based on traffic flows with a specific bearer ID.

SDN switches 904 may be capable of forwarding user plane traffic encapsulated with GTP-U protocol at the packet level and control plane traffic in a stream control transmission protocol (SCTP) packet. SDN switches 904 may be solely allowed to handle the user plane traffic, and forbidden to conduct modification on control plane traffic. SDN switch 904-2 may have the RAN signaling messages transparently pass through itself. As illustrated in FIG. 9, SDN switch 904-2 may extract the original user packet from the GTP-U packet with the decapsulation for possible user packet handling. Then, the user packet may be re-encapsulated into another GTP-U packet and sent over another GTP tunnel.

Figure 10:
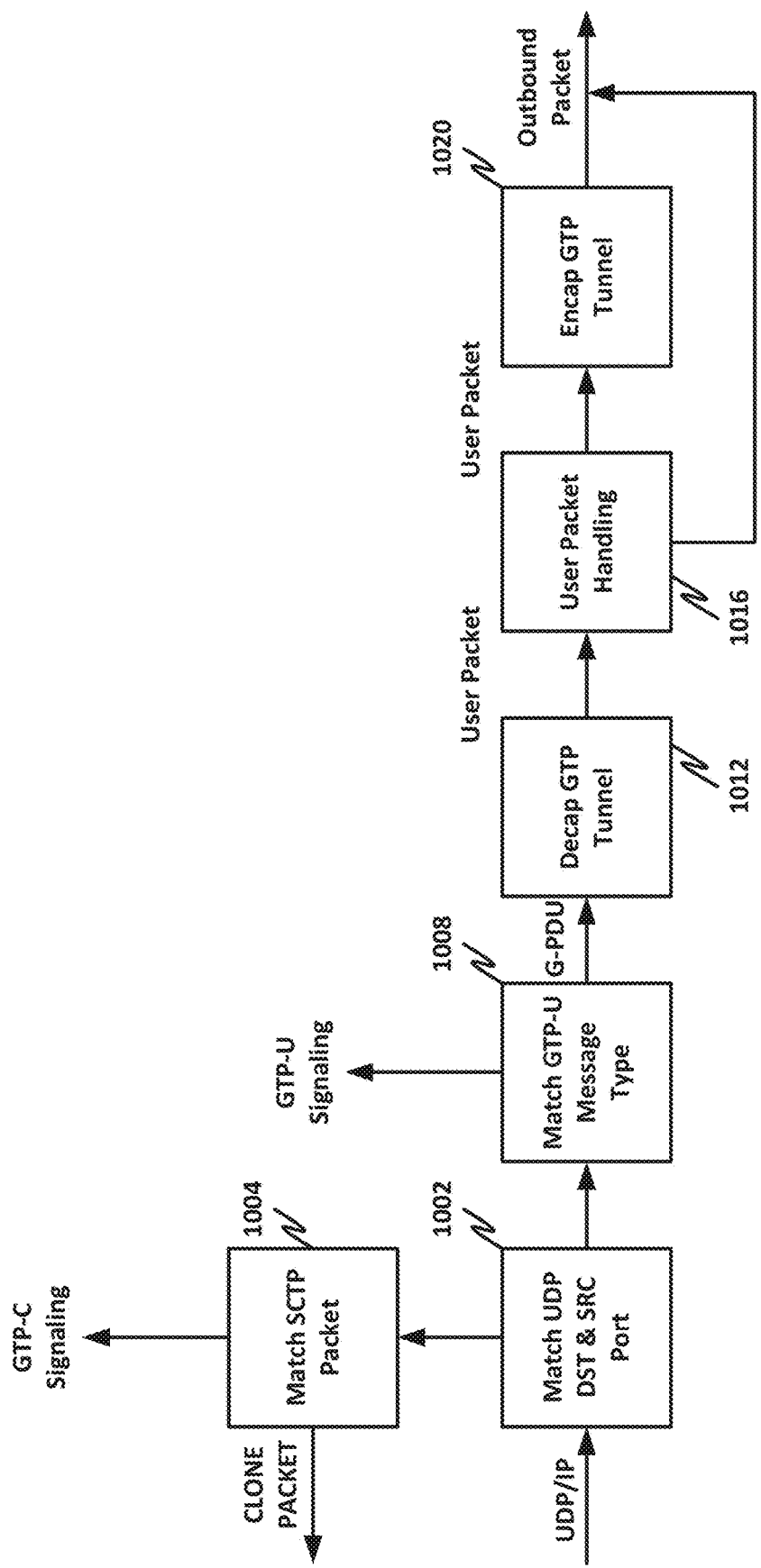
FIG. 10 is a flow diagram illustrating packet flow and processing, according to one or more examples of the present specification.

FIG. 10 is a flow diagram illustrating packet flow and processing, according to one or more examples of the present specification.

According to the flow of FIG. 10, an incoming user datagram protocol/Internet Protocol (UDP/IP) packet is received at block 1002, which may match the UDP destination and source ports to a configured value, such as port 2152. In block 1002, the system may pass the packet to block 1004, where the packet is matched to its corresponding SCTP packet. Block 1004 may then provide a clone of the packet to the RAN control plane sniffer. Block 1004 may also provide GTP core network data tunneling (GTP-C) signaling to the mobile core network.

Returning to block 1002, upon matching UDP destination and source ports, the packet may be provided to block 1008, which matches the GTP-U message type. Block 1008 may provide appropriate GTP-U signaling to the mobile core network as necessary (e.g., via the S1 interface).

The packet is then provided as a GTP protocol data unit (G-PDU) to a decapsulation GTP tunnel block 1012. Decapsulation GTP tunnel block 1012 provides the user packet to block 1016, which provides user packet handling, and which may route the packet as an outbound packet. In parallel, user packet handling block 1016 may provide the user packet to block 1020, which encapsulates the packet in a GTP tunnel, and may also provide an outbound packet with the GTP tunneling.

To enable GTP processing as illustrated in this FIGURE, the following extensions may be made to OpenFlow messages.

First, action extensions may be provided. This can include extensions to encapsulation as in block 1020. This extension adds, for example, the GTP-U header to the original user packet. In decapsulation as in block 1012, the GTP-U header may be removed from the original user packet. The GTP-U extension headers (for example, service class indicator) and flags may be kept until there is no encapsulation action applied to the original user packet.

Extensions may also be provided for field matching as in block 1008. For example, field matching may be provided for GTP message type. To distinguish GTP-U packets with the original user packet from other GTP-U signal messages, the switch may be provided with the ability to identify the "message type" of the GTP-U header. In one embodiment, only GTP-U packets whose message type is 0xFF may be processed in the switch. Given other message types, the GTP-U packet is simply forwarded with the traditional Layer 3 policy where the packet is forwarded to the port referring to its destination IP address.

Further extensions to field matching may be provided in the GTP tunnel endpoint identifier (TEID). The switch may be able to match the GTP TEID information element (IE) of GTP-U header to distinguish whether a G-PDU packet belongs to an established GTP-U tunnel or not. For G-PDU packets without the matching TEID, the switch may send the packet by referring to its destination IP address.

A further extension to field matching may be provided in the GTP flag. The GTP flag is a field allowing the bitwise mask. It may be used to identify the GTP-U packet purely based on the payload bits without any other extensions such as sequence number and the extended header.

Further extensions to field matching may be provided according to the source IP address in the packet encapsulated in GTP-U. The source IP address in the packet encapsulated in the GTP-U may be used to identify which terminal sends out the packet passing through the SDN switch. This enables user-specific operation in the user plane traffic.

Further extensions to the field matching may be provided according to the destination IP address in packets encapsulated in GTP-U. The destination IP address of packets encapsulated in the GTP-U may be used to identify the destination of the packet passing through the SDN switch. This enables traffic offloading to the local server in the user plane traffic.

Further extensions to field matching may be provided according to source and destination port in packets encapsulated in GTP-U. The source/destination port in a packet encapsulated in the GTP-U may be used to identify the type of traffic exchange between the RAN and the mobile core network. This enables service-specific operation in user plane traffic by being used in conjunction with the network protocol ID. For example, UDP traffic with the destination port of 53 may be identified as supporting domain name server (DNS) caching at the network edge.

Further extensions to field matching may be provided in network protocol ID in packets encapsulated in GTP-U. The network protocol ID in a packet encapsulated in GTP-U denotes the specific network protocol enabled in the encapsulated packet. This can be used jointly with the source and destination port in the packet encapsulated in the GTP-U to enable the service-specific processing at the network edge.

Extensions may also be provided according to RAN signaling sniffing. To enable the RAN control signaling parsing conducted in the RAN control plane sniffer, the SDN switch may have the flow entry for signaling sniffing installed by default. More specifically, a clone of the passing SCTP packet may be forwarded to the RAN control plane sniffer. This can be implemented with a group table whose type is "All" to enable the SCTP packet to be output to two ports connecting the RAN control plane sniffer and the mobile core network, respectively.

The SDN controller, such as SDN controller 912 of FIG. 9, is responsible for the flow table configuration and for collecting traffic statistics. The SDN controller may also support the extensions described above, such as in its OpenFlow messaging. On the other hand, a representational state transfer (RESTful)-based NBI may be provided on the mobile core network, and on the local server for the offloading policy setting. The SDN controller may be able to support basic Layer 2 and Layer 3 networking functions to enable correct packet forwarding, given the absence of a matching entry for GTP-U packets. In some embodiments, this may be the default Layer 3 routing entry for backhaul to the mobile core network. Medium access control (MAC) learning may also be available for appropriate Layer 2 forwarding between the RAN elements.

QoS provisioning in the SDN switch may be implemented with meters, such as those defined in OpenFlow. Meters allow for rate monitoring of traffic before it is output. Specifically, with meters the switch may monitor ingress rate of traffic as defined by a flow. Flows can direct packets to a meter using a "goto-meter" OpenFlow instruction, where the meter can then perform some operation based on the rate it receives packets. Meters may be installed, modified, and removed at runtime in the SDN switch using OpenFlow.

Meters may be installed in the SDN switch to enable the policy control enhancements described in this specification. This may be done using an "ADD meter-mod" message. Meters can be modified or removed using the meter-mod MODIFY and DELETE messages, respectively.

After installation, incoming packets may be guided to the meter using the goto-meter instruction in a flow. Multiple flows may send packets to the same meter, or each flow can direct packets to individual meters.

Embodiments of OpenFlow require the SDN switch to evaluate the goto-meter instruction in a flow before applying action instructions. This ensures that the meter performs its task (such as dropping the packet) before it is potentially sent out. If a meter drops the packet, any further instructions in the flow are not processed for that particular packet.

In some embodiments, the meter may be installed by the SDN controller given a user equipment (UE)-specific context created by the RAN control plane sniffer. In some embodiments, the meter may be configured according to QoS parameters. For example, the maximum bit rate associated with a specific traffic flow may be used to set the rate value of the meter. In one embodiment, the rate may be extracted from the bearer setup messages.

Figure 11A:
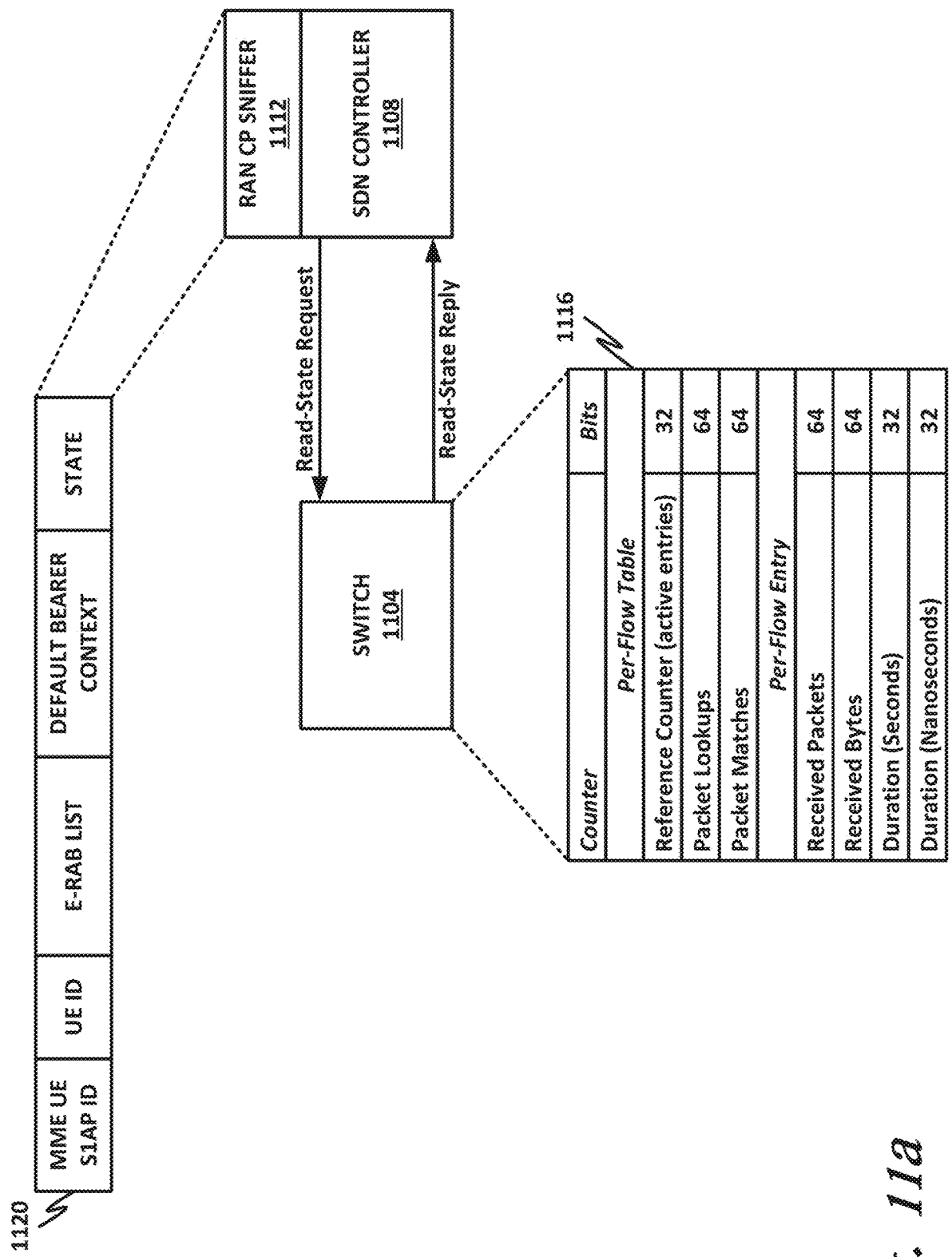
FIGS. 11a-11b are block diagrams of packet handling via a switch and SDN controller, according to one or more examples of the present specification.
Figure 11B:
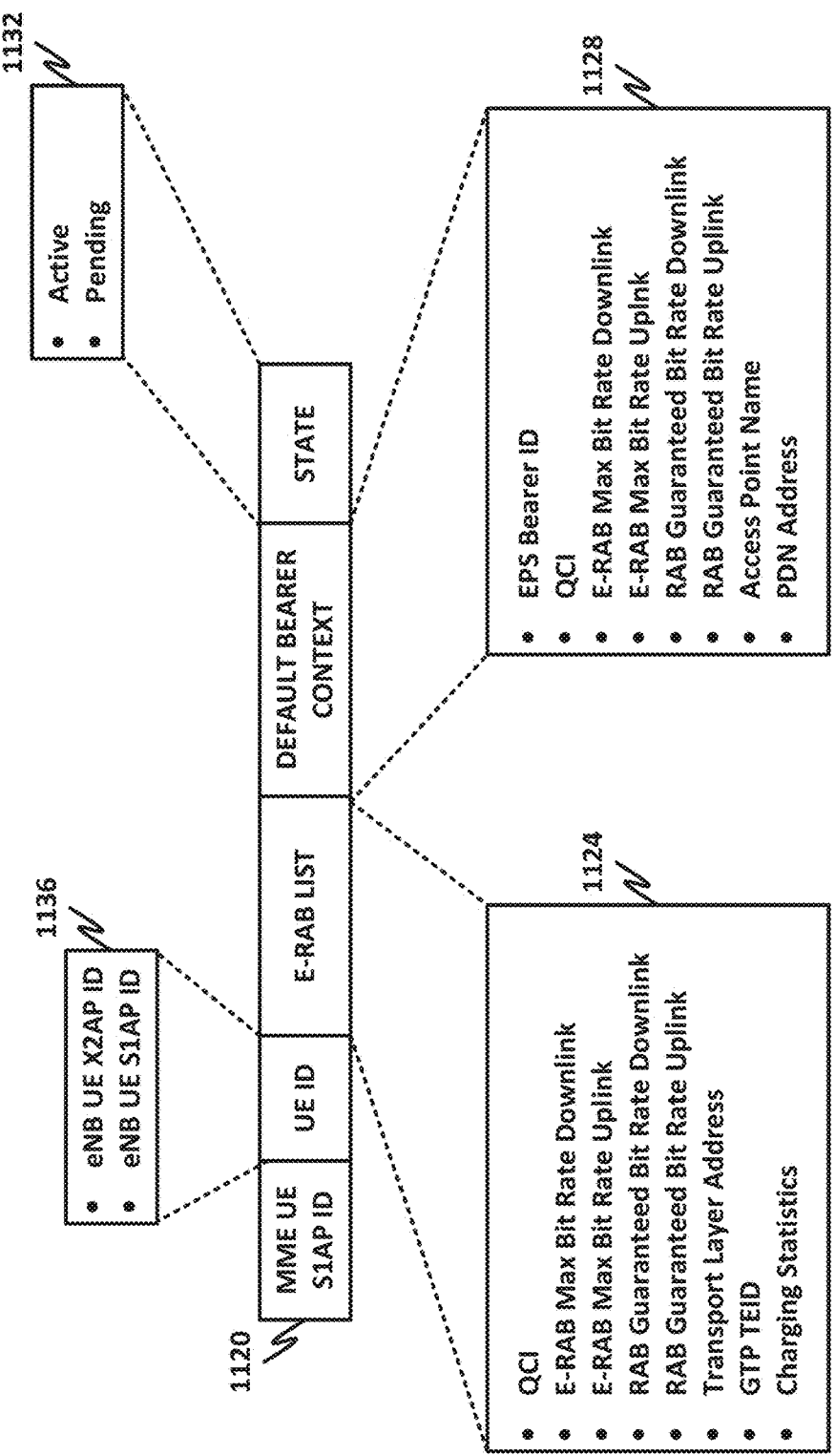

FIGS. 11a-11b are block diagrams of packet handling via a switch 1104 and SDN controller 1108, according to one or more examples of the present specification. In these examples, OpenFlow-compliant counters may be maintained for flow entries associated with user plane traffic. These counters can be used to conduct the charging in the SDN switch. As illustrated in FIGS. 11a and 11b, the statistics counted as receiving bytes are collected by SDN controller 1108 with the read state messages. In LTE networks, the charging statistics may be maintained in an E-UTRAN radio access bearer (E-RAB) specific way and stored in the corresponding data recorder for the UE-specific context created by the RAN control plane (CP) sniffer 1112. Charging statistics may be shared to the charging system of the mobile network.

RAN CP sniffer may be responsible for parsing the RAN control signaling exchanged between the RAN and the mobile core network so that a third party may configure the advanced routing policy in switch 1104. Advanced routing policies may include, by way of nonlimiting example:

Bearer level. The third party may create the routing policy oriented to a specific EPS bearer, which may be identified with the EPS bearer ID.

PDN connectivity level. The third party may create the routing policy oriented to the specific PDN connectivity that is identified with the APN.

QoS class identifier (QCI) level. The third party may create the routing policy specific to the user traffic with a particular QoS priority in terms of resource allocation.

Combined level. The third party may create the routing policy at the level of combining the bearer and the PDN connectivity. For example, the third party may ask for the routing policy creation oriented to the bearer in the specific PDN connectivity model.

Available counters are illustrated in block 1116, by way of nonlimiting example. Available counters may include per-flow table counters and per-flow entry counters. For example, per-flow table counters may include a 32-bit reference counter for active entries, a 64-bit counter packet lookup counter, and a 64-bit packet match counter. Per-flow entry counters may include a 64-bit received packets counter, a 64-bit received bytes counter, a 32-bit duration counter in seconds, and a 32-bit duration counter in nanoseconds.

RAN CP sniffer 1112 may maintain a state structure 1120. Additional details of state structure 1120 are illustrated in FIG. 11b.

RAN CP sniffer 1112 may be capable of interpreting the SCTP session. In LTE networks, the RAN CP signaling may be parsed on the RAN CP sniffer. This may include, by way of nonlimiting example:

E-RAB setup request and response.
Initial context setup request and response.
X2AP handover request and acknowledge.
X2AP UE context release.
S1AP path switch request and acknowledge.
UE context release command and complete.
E-RAB modify request and response.

The data in record 1120 may be used to maintain the UE-specific context tracking for the LTE network. As illustrated in FIG. 11b, each record may be indexed with the MME UE S1AP ID and associated with the states categorized into active and pending as illustrated in block 1132. SDN controller 1108 may be able to convert the advanced routing policy configuration by the third party into the flow capable of being processed by switch 1104 with reference to record 1120.

Record 1120 may also include a UE ID, which according to block 1136 may include eNodeB UE X2AP ID and eNodeB UE S1AP ID. Record 1120 may further include an E-RAB list and default bearer context.

As illustrated in block 1124, the E-RAB list may include, by way of nonlimiting example:

QCI.
E-RAB max bit rate downlink.
E-RAB max bit rate uplink.
RAB guaranteed bit rate downlink.
RAB guaranteed bit rate uplink.
Transport layer address.
GTP TEID.
Charging statistics.

As illustrated in block 1128, default bearer context may include by way of nonlimiting example:

EPS bearer ID.
QCI.
E-RAB max bit rate downlink.
E-RAB max bit rate uplink.
RAB guaranteed bit rate downlink.
RAB guaranteed bit rate uplink.
Access point name.
PDN address.

The signaling message for a request delivery, for example an initial context setup request, may cause the creation of a data record 120 with the state of "pending." Upon detecting the response signaling such as an initial context setup response, a record may be created or updated with the status of "active." In certain embodiments, only a record 1120 whose state is active is allowed to be used for the translation of third party routing policy configuration.

The signaling for the UE context release, for example a UE context release command, may lead to the state of the corresponding record 1120 returning to the "pending" state. The response signaling then causes the UE context release command "complete" to remove the record from the RAN CP sniffer 1112.

In certain embodiments, only a record with MME UE S1AP ID may be allowed to trigger the creation of a data record 1120 in RAN CP sniffer 1112. Any record 1120 without the MME UE S1AP ID may be omitted because there is no record containing the identification, for example, as E-RAB ID mentioned in the signaling body. The processing of third party routing policy configuration information may proceed as follows:

1. The RAN CP sniffer may first check the data record of the UE-specific context with the keys in the routing policy configuration such as the APN or the E-RAB ID.

2. If there is no matching record, the RAN CP sniffer may mark the configuration as pending until a matched record is created. In other words, the RAN CP sniffer may check whether there is a pending configuration request, which may be served after the creation of the update of the data record for the UE-specific context tracking.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the FIGURES may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a radio access network (RAN) user plane processing entity (UPPE) for a mobile data network, comprising: a hardware platform; a virtual switch to operate on the hardware platform; a network interface to communicatively couple to a local server; and a software defined networking controller, comprising a radio access network (RAN) control plane (CP) sniffer, and configured to: receive a control plane traffic offloading rule via a northbound interface, the traffic offloading rule configured to offload a class of traffic to the local server; operate the RAN CP sniffer to build a user-plane flow control message according to the offloading rule; and send the flow control message to the virtual switch.

Example 2 includes the RAN UPPE of example 1, wherein the control plane offloading rule comprises an access point name (APN) or bearer identification.

Example 3 includes the RAN UPPE of example 1, wherein the virtual switch is to build a user plane rule from the flow control message, the user plane rule comprising a GTP-ID or IP address to offload to the local server.

Example 4 includes the RAN UPPE of example 1, wherein building the flow control message comprises extracting a user equipment (UE) identifier or bearer identifier from an S1 signaling message.

Example 5 includes the RAN UPPE of example 1, wherein the user plane rule is to offload traffic according to a multi-access edge computing (MEC) protocol.

Example 6 includes the RAN UPPE of any of examples 1-5, wherein the flow control message is an OpenFlow-compatible message, and the user plane rule is an OpenFlow-compatible rule.

Example 7 includes the RAN UPPE of example 1, wherein the virtual switch is to: receive an encapsulated user plane packet; extract an original user plane packet from the encapsulated user plane packet comprising a removing a header; determine a message type of the user plane packet according to the header; and process the user plane packet according to the flow control rule.

Example 8 includes the RAN UPPE of example 6, wherein the user plane packet is a general packet radio service (GPRS) tunneling protocol (GTP) user plane (GTP-U) packet.

Example 9 includes the RAN UPPE of example 7, wherein the virtual switch is to provide GTP-U encapsulation and decapsulation.

Example 10 includes the RAN UPPE of example 7, wherein the virtual switch is further to receive a control plane packet and forward the control plane packet unmodified.

Example 11 includes the RAN UPPE of example 1, wherein the RAN UPPE is further to communicatively couple to a charging system to maintain tracking of offloaded traffic.

Example 12 includes one or more tangible, non-transitory computer-readable mediums having stored thereon executable instructions to: communicatively couple to a local server; receive a control plane traffic offloading rule via a northbound interface, the traffic offloading rule configured to offload a class of traffic to the local server; build a user-plane flow control message according to the offloading rule; and send the flow control message to a virtual switch.

Example 13 includes the one or more tangible, non-transitory computer-readable mediums of example 12, wherein the control plane offloading rule comprises an access point name (APN) or bearer identification.

Example 14 includes the one or more tangible, non-transitory computer-readable mediums of example 12, wherein the instructions are further to build a user plane rule from the flow control message, the user plane rule comprising a GTP-ID or IP address to offload to the local server.

Example 15 includes the one or more tangible, non-transitory computer-readable mediums of example 12, wherein building the flow control message comprises extracting a user equipment (UE) identifier or bearer identifier from an S1 signaling message.

Example 16 includes the one or more tangible, non-transitory computer-readable mediums of example 12, wherein the user plane rule is to offload traffic according to a multi-access edge computing (MEC) protocol.

Example 17 includes the one or more tangible, non-transitory computer-readable mediums of any of examples 12-16, wherein the flow control message is an OpenFlow-compatible message, and the user plane rule is an OpenFlow-compatible rule.

Example 18 includes the one or more tangible, non-transitory computer-readable mediums of example 12, wherein the instructions are further to: receive an encapsulated user plane packet; extract an original user plane packet from the encapsulated user plane packet comprising a removing a header; determine a message type of the user plane packet according to the header; and process the user plane packet according to the flow control rule.

Example 19 includes the one or more tangible, non-transitory computer-readable mediums of example 18, wherein the user plane packet is a general packet radio service (GPRS) tunneling protocol (GTP) user plane (GTP-U) packet.

Example 20 includes the one or more tangible, non-transitory computer-readable mediums of example 19, wherein the instructions are further to provide GTP-U encapsulation and decapsulation.

Example 21 includes the one or more tangible, non-transitory computer-readable mediums of example 18, wherein the instructions are further to receive a control plane packet and forward the control plane packet unmodified.

Example 22 includes the one or more tangible, non-transitory computer-readable mediums of example 18, wherein the instructions are further to communicatively couple to a charging system to maintain tracking of offloaded traffic.

Example 23 includes an apparatus comprising means to execute the instructions of any of examples 12-22.

Example 24 includes the apparatus of example 23, wherein the means comprise a processor and a memory.

Example 25 includes a computer-implemented method providing a radio access network (RAN) user-plane processing entity (UPPE), comprising: communicatively coupling to a local server; receiving a control plane traffic offloading rule via a northbound interface, the traffic offloading rule configured to offload a class of traffic to the local server;

building a user-plane flow control message according to the offloading rule; and sending the flow control message to a virtual switch.

Example 26 includes the method of example 25, wherein the control plane offloading rule comprises an access point name (APN) or bearer identification.

Example 27 includes the method of example 25, further comprising building a user plane rule from the flow control message, the user plane rule comprising a GTP-ID or IP address to offload to the local server.

Example 28 includes the method of example 25, wherein building the flow control message comprises extracting a user equipment (UE) identifier or bearer identifier from an S1 signaling message.

Example 29 includes the method of example 25, wherein the user plane rule is to offload traffic according to a multi-access edge computing (MEC) protocol.

Example 30 includes the method of example 25, wherein the flow control message is an OpenFlow-compatible message, and the user plane rule is an OpenFlow-compatible rule.

Example 31 includes the method of example 25, further comprising: receiving an encapsulated user plane packet; extracting an original user plane packet from the encapsulated user plane packet comprising a removing a header; determining a message type of the user plane packet according to the header; and processing the user plane packet according to the flow control rule.

Example 32 includes the method of example 31, wherein the user plane packet is a general packet radio service (GPRS) tunneling protocol (GTP) user plane (GTP-U) packet.

Example 33 includes the method of example 32, further comprising providing GTP-U encapsulation and decapsulation.

Example 34 includes the method of example 31, further comprising receiving a control plane packet and forwarding the control plane packet unmodified.

Example 35 includes the method of example 31, further comprising receiving communicatively coupling to a charging system to maintain tracking of offloaded traffic.

Example 36 includes an apparatus comprising means for performing the method of any of examples 25-35.

Example 37 includes the apparatus of example 36, wherein the means for performing the method comprise a processor and a memory.

Example 38 includes the apparatus of example 37, wherein the memory comprises machine-readable instructions, that when executed cause the apparatus to perform the method of any of examples 25-35.

Example 39 includes the apparatus of any of examples 36-38, wherein the apparatus is a computing system.

Example 40 includes at least one computer readable medium comprising instructions that, when executed, implement a method or realize an apparatus as illustrated in any of examples 25-39.

What is claimed is:

1. An apparatus, comprising:
a memory; and
a processor, wherein instructions stored in the memory, when executed by the processor, cause the processor to:
obtain a filtering rule provided by a content provider for a service via a control plane message that includes a bearer identifier (ID) or access point name (APN); and
configure a virtual switch to translate the bearer ID or APN to generate a general packet radio service (GPRS) tunneling protocol (GTP) identifier (GTP-ID) to use in the filtering rule to cause a data packet received at the virtual switch to be sent to a local edge server for processing based on the GTP-ID to use in the filtering rule and based on a GTP-ID included in the data packet, wherein the local edge server is located remote to a mobile core network, and wherein the data packet sent to the local edge server for processing is associated with the service.

2. The apparatus of claim 1, wherein the filtering rule, when implemented by the virtual switch, is to cause the virtual switch to designate data packets for processing at the local edge server or processing at the mobile core network based on a GTP-ID included in data packets received by the virtual switch matching the GTP-ID to use in the filtering rule.

3. The apparatus of claim 1, wherein to cause the data packet to be sent to the local edge server for processing comprises the virtual switch to cause the data packet to be offloaded to the local edge server for multi-access edge computing (MEC).

4. The apparatus of claim 3, comprising the MEC to include GTP encapsulation, GTP decapsulation and packet filtering.

5. The apparatus of claim 3, comprising a virtual machine at the local edge server to be configured for the MEC, wherein the data packet is offloaded for processing by the virtual machine.

6. A non-transitory computer-readable storage medium, comprising a plurality of instructions that when executed by a system, cause the system to:
obtain a filtering rule provided by a content provider for a service via a control plane message that includes a bearer identifier (ID) or access point name (APN); and
configure a virtual switch to translate the bearer ID or APN to generate a general packet radio service (GPRS) tunneling protocol (GTP) identifier (GTP-ID) to use in the filtering rule to cause a data packet received at the virtual switch to be sent to a local edge server for processing based on the GTP-ID to use in the filtering rule and based on a GTP-ID included in the data packet, wherein the local edge server is located remote to a mobile core network, and wherein the data packet sent to the local edge server for processing is associated with the service.

7. The non-transitory computer-readable storage medium of claim 6, wherein the filtering rule, when implemented by the virtual switch, is to cause the virtual switch to designate data packets for processing at the local edge server or processing at the mobile core network based on a GTP-ID included in data packets received by the virtual switch matching the GTP-ID to use in the filtering rule.

8. The non-transitory computer-readable storage medium of claim 6, wherein to cause the data packet to be sent to the local edge server for processing comprises the virtual switch to cause the data packet to be offloaded to the local edge server for multi-access edge computing (MEC).

9. The non-transitory computer-readable storage medium of claim 8, comprising the MEC to include GTP encapsulation, GTP decapsulation, or packet filtering.

10. The non-transitory computer-readable storage medium of claim 8, comprising a virtual machine at the local edge server to be configured for the MEC, wherein the data packet is offloaded for processing by the virtual machine.

11. A method implemented at a software defined networking controller, comprising:

obtaining a filtering rule provided by a content provider for a service via a control plane message that includes a bearer identifier (ID) or access point name (APN); and configuring a virtual switch to translate the bearer ID or APN to generate a general packet radio service (GPRS) tunneling protocol (GTP) identifier (GTP-ID) to use in the filtering rule to cause a data packet received at the virtual switch to be sent to a local edge server for processing based on the GTP-ID to use in the filtering rule and based on a GTP-ID included in the data packet, wherein the local edge server is located remote to a mobile core network, and wherein the data packet sent to the local edge server for processing is associated with the service.

12. The method of claim 11, wherein the filtering rule, when implemented by the virtual switch, is to cause the virtual switch to designate data packets for processing at the local edge server or processing at the mobile core network based on a GTP-ID included in data packets received by the virtual switch matching the GTP-ID to use in the filtering rule.

13. The method of claim 11, wherein to cause the data packet to be sent to the local edge server for processing comprises offloading the data packet to the local edge server for multi-access edge computing (MEC).

14. The method of claim 13, comprising the MEC to include GTP encapsulation, GTP decapsulation, or packet filtering.

\* \* \* \* \*